United States Patent
Li et al.

(10) Patent No.: US 11,191,099 B2
(45) Date of Patent: Nov. 30, 2021

(54) DATA TRANSMISSION METHOD AND DEVICE, AND STORAGE MEDIUM

(71) Applicant: XI'AN ZHONGXING NEW SOFTWARE CO., LTD., Shaanxi (CN)

(72) Inventors: Xincai Li, Shenzhen (CN); Yajun Zhao, Shenzhen (CN); Wei Gou, Shenzhen (CN); Feng Bi, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 150 days.

(21) Appl. No.: 16/089,531

(22) PCT Filed: Mar. 15, 2017

(86) PCT No.: PCT/CN2017/076773
§ 371 (c)(1),
(2) Date: Sep. 28, 2018

(87) PCT Pub. No.: WO2017/167014
PCT Pub. Date: Oct. 5, 2017

(65) Prior Publication Data
US 2020/0170032 A1   May 28, 2020

(30) Foreign Application Priority Data
Mar. 31, 2016   (CN) .......................... 201610200181.1

(51) Int. Cl.
*H04W 72/12* (2009.01)
*H04L 1/18* (2006.01)
*H04W 72/04* (2009.01)

(52) U.S. Cl.
CPC ....... *H04W 72/1289* (2013.01); *H04L 1/1812* (2013.01); *H04W 72/0446* (2013.01); *H04W 72/1268* (2013.01)

(58) Field of Classification Search
None
See application file for complete search history.

(56) References Cited

U.S. PATENT DOCUMENTS

2011/0142075 A1* 6/2011 Che .................. H04L 5/0053
                                                          370/476
2012/0294210 A1   11/2012 Jiang
(Continued)

FOREIGN PATENT DOCUMENTS

CN   101971681 A   2/2011
CN   102137504 A   7/2011
(Continued)

OTHER PUBLICATIONS

International Search Report in international application No. PCT/CN2017/076773, dated May 27, 2017, 2 pgs.
(Continued)

*Primary Examiner* — Kenny S Lin
*Assistant Examiner* — Richard Schnell
(74) *Attorney, Agent, or Firm* — Cantor Colburn LLP

(57) ABSTRACT

The present invention provides a data transmission method, comprising: sending scheduling information to a terminal on a downlink subframe, wherein the scheduling information is used for scheduling the terminal to transmit uplink data on one or more uplink subframes of an unlicensed carrier; and receiving the uplink data transmitted by the terminal. The present invention provides a technical solution of multi-subframe scheduling in the unlicensed carrier which does not exist in the prior art. The present invention also provides a data transmission device and a storage medium.

14 Claims, 6 Drawing Sheets

---

Scheduling information is sent to a UE in a downlink subframe, the scheduling information being used to schedule the UE to transmit UL data in one or more UL subframes on an unlicensed carrier — S102

The UL data transmitted by the UE is received — S104

(56) References Cited

U.S. PATENT DOCUMENTS

| | | | | |
|---|---|---|---|---|
| 2013/0016686 | A1* | 1/2013 | Li | H04L 1/1822 |
| | | | | 370/329 |
| 2013/0215862 | A1* | 8/2013 | Suzuki | H04W 76/27 |
| | | | | 370/329 |
| 2014/0286281 | A1* | 9/2014 | Jang | H04L 5/0092 |
| | | | | 370/329 |
| 2014/0362780 | A1 | 12/2014 | Malladi et al. | |
| 2015/0264708 | A1 | 9/2015 | Li | |
| 2016/0233989 | A1* | 8/2016 | Belghoul | H04L 5/0092 |
| 2017/0257864 | A1* | 9/2017 | Kakishima | H04J 1/00 |
| 2018/0092128 | A1* | 3/2018 | Um | H04W 72/0406 |
| 2018/0132271 | A1* | 5/2018 | Jung | H04W 72/1273 |

FOREIGN PATENT DOCUMENTS

| | | |
|---|---|---|
| CN | 102202408 A | 9/2011 |
| CN | 102648646 A | 8/2012 |
| CN | 103796327 A | 5/2014 |
| CN | 104144513 A | 11/2014 |
| CN | 104540230 A | 4/2015 |
| CN | 104581908 A | 4/2015 |
| CN | 105356967 A | 2/2016 |

OTHER PUBLICATIONS

English Translation of the Written Opinion of the International Search Authority in international application No. PCT/CN2017/076773, dated May 27, 2017, 7 pgs.

3GPP TSG RAN WG1 Meeting #73, R1-132202, Discussion on Multi-Subframe Scheduling, May 2013, 5 pgs.

3GPP TSG RAN WG1 #72bis, R1-131023, "Considerations on Multi-Subframe Scheduling", Apr. 2013, 2 pgs.

3GPP TSG RAN WG1 Meeting #72b, R1-130892, "Analysis on Control Signaling Enhancements", Apr. 2013, 3 pgs.

3GPP TSG RAN WG1 Meeting #73, R1-132057, "Consideration for Multi-SF and Cross-SF Scheduling in LTE-A", May 2013, 3 pgs.

3GPP TSG RAN WG1 Meeting #73, R1-132336, "Multi-Subframe and Cross-Subframe Scheduling in Small Cells", May 2013, 3 pgs.

3GPP TS 36.212 V9.0.0, Dec. 2009, Technical Specification Group Radio Access Network; "Evolved Universal Terrestrial Radio Access (E-UTRA)", 61 pgs.

3GPP TSG RAN WG1 Meeting #83, R1-156575; Nov. 2015; "Design of UL LBT for LAA", 4 pgs.

* cited by examiner

DATA TRANSMISSION METHOD AND DEVICE, AND STORAGE MEDIUM

TECHNICAL FIELD

The disclosure relates to the field of communications, and particularly to a method and device for transmitting data and a storage medium.

BACKGROUND

In an evolution process of Long-Term Evolution (LTE), an important content in LTE Release-13 (Rel-13) is use of unlicensed carriers for work of LTE systems. This technology may make an existing unlicensed carrier available for an LTE system, greatly improve potential spectrum resources of the LTE system and enable the LTE system to achieve lower spectrum cost.

However, use of an unlicensed carrier for data transmission of LTE is confronted with many problems, partially as follows.

For Uplink (UL) data transmission of User Equipment (UE), an UL grant is required to be sent by a base station to the UE at first, and the UE, after receiving the UL grant and before transmitting UL data, is required to perform Clear Channel Assessment (CCA). That is, the UE successfully contends for a resource. The time when the base station sends a UL scheduling grant and the time when the UE actually transmits the UL data form a 4 ms timing relationship, which may bring the problem of low UL transmission rate. Particularly in a self-scheduling scenario, UL transmission is allowed only when both of the base station and the UE succeed in CCA, which may result in a low UL transmission rate and relatively low UL performance. Therefore, it is necessary to consider some methods for increasing the UL transmission rate or improving the UL performance.

It is determined at the 84th meeting for 3rd Generation Partnership Project (3GPP) Radio Access Network (RNA) 1 # that UL multi-subframe scheduling is supported by an unlicensed carrier. But details about implementation of specific multi-subframe scheduling and solutions to corresponding problems have yet not been discussed. In addition, when different UEs are scheduled in continuous subframes, how to implement multi-user multiplexing is also a problem to be solved.

For the above technical problems in the related art, there is yet no effective solution at present.

SUMMARY

In view of this, embodiments of the disclosure are expected to provide a method and device for transmitting data and a storage medium, to at least solve the problem that there are no technical solutions for multi-subframe scheduling on an unlicensed carrier in the related art.

According to an aspect of the embodiments of the disclosure, a method for transmitting data is provided, which includes that: scheduling information is sent to an UE in a downlink subframe, the scheduling information being used to schedule the UE to transmit UL data on at least one UL subframe on an unlicensed carrier; and the UL data transmitted by the UE is received.

In an embodiment, when multiple UEs are to be scheduled by a base station, the multiple UEs may be scheduled in one of the following manners: a first manner: a same set of UEs are scheduled on all of the multiple UL subframes; and a second manner: a different set of UEs are scheduled on each of the multiple UL subframes.

In an embodiment, when the UE is scheduled in the first manner, the operation that the scheduling information is sent to the UE scheduled by the base station in the downlink subframe may include that: the scheduling information is sent to the UE in the downlink subframe in a broadcast manner.

In an embodiment, the broadcast manner may include Downlink Control Information (DCI).

In an embodiment, when the UE is scheduled in the second manner, the operation that the scheduling information is sent to the UE scheduled by the base station in the downlink subframe may include that: the scheduling information is sent to the UE in the downlink subframe through a Physical Downlink Control Channel (PDCCH)-specific search space or enhanced PDCCH (ePDCCH)-specific search space.

In an embodiment, the scheduling information may include at least one of the following information: a backoff value of random backoff of CCA; a value of a Contention Window (CW); a CCA type; locations of the multiple UL subframes; a number of continuously scheduled subframes; a length of a scheduled UL burst; first indication information used to indicate an UL subframe in which at least one symbol is reserved or kept blank in the multiple UL subframes; second indication information used to indicate a number of the reserved or blank symbols; and the number of symbols occupied by data in each UL subframe or last UL subframe in the multiple UL subframes.

In an embodiment, the CCA type may be related to a Maximum Channel Occupation Time (MCOT) and a scheduling manner; when the scheduling manner is self-scheduling and the at least one UL subframe and the downlink subframe belong to the same MCOT, the CCA type may be CCA of a predefined detection duration; when the scheduling manner is self-scheduling and the at least one UL subframe and the downlink subframe do not belong to the same MCOT, the CCA type may be CCA of multiple detections with random backoff; and when cross-carrier scheduling is adopted, the CCA type may be CCA of multiple detections including random backoff.

In an embodiment, the backoff value of random backoff of CCA or the value of the CW may be determined according to at least one of: the number of the continuously scheduled UL subframes, the backoff value of random backoff of CCA or the value of the CW being larger if the number is larger; and a backoff value of random backoff of CCA corresponding to one of the plurality of UL subframes at a lowest quality of service (QoS) level, or a value of a CW of CCA corresponding to one of the plurality of UL subframes at a lowest QoS level.

In an embodiment, when the same set of UEs are scheduled in all of the multiple UL subframes, the number of the continuously scheduled subframes may be determined through one of the plurality of scheduled UEs with a minimum Buffer Status Report (BSR).

In an embodiment, when new UE is scheduled during the multiple UL subframes or the different set of UEs are scheduled in each of the multiple UL subframes, at least one of the first indication information or the second indication information may be sent to the UE.

In an embodiment, a location of the subframe where the at least one blank symbol is located may be indicated in a bitmap manner.

In an embodiment, the at least one blank symbol may be at least one of: a last symbol of a previous subframe of the first one of the multiple UL subframes where the newly scheduled UE is scheduled; a first symbol of the first one of the multiple UL subframes where the newly scheduled UE is scheduled; a first symbol of the first one of the multiple UL subframes; and a last symbol in the last one of the multiple UL subframes.

In an embodiment, the DCIs corresponding to the multiple UL subframes are the same DCI or different DCIs; when the DCIs corresponding to the plurality of UL subframes are the same DCI, the DCI corresponding to the multiple UL subframes may be born through a PDCCH or an ePDCCH; and when the DCIs corresponding to the plurality of UL subframes are different DCIs, the DCI corresponding to each of the multiple UL subframes may be independently coded and the DCIs corresponding to the multiple UL subframes may be born through multiple PDCCHs or ePDCCHs or the DCIs corresponding to the multiple UL subframes may be jointly coded and the DCIs corresponding to the multiple UL subframes may be born through a PDCCH or an ePDCCH.

In an embodiment, under at least one of the following conditions, the DCI corresponding to each of the multiple UL subframes may be independently coded and the DCIs corresponding to the multiple UL subframes may be born through multiple PDCCHs or ePDCCHs or the DCIs corresponding to the multiple UL subframes may be jointly coded and the DCIs corresponding to the multiple UL subframes may be born through a PDCCH or an ePDCCH: the multiple UL subframes are discontinuous; the multiple UL subframes belong to different Transmission Opportunities (TXOPs); the multiple UL subframes belong to different UL bursts; the multiple UL subframes are spaced by at least one downlink subframe; or when two adjacent UL subframes of the plurality of UL subframes are spaced by a plurality of subframes, a number of the plurality of subframes being larger than a predetermined value.

In an embodiment, under at least one of the following conditions, the DCIs corresponding to the multiple UL subframes may be born through a PDCCH or an ePDCCH: the multiple UL subframes are continuous; or the multiple UL subframes belong to the same TXOP.

In an embodiment, each of the multiple UL subframes may transmit a data packet, and the data packet transmitted in each of the multiple UL subframes and at least one of a Hybrid Automatic Repeat reQuest (HARQ) process number or New Data Indicator (NDI) of the data packet transmitted in each UL subframe may be determined in one of the following manners.

when the multiple UL subframes transmit multiple different data packets, each of the multiple data packets has an independent HARQ process number; when the multiple UL subframes transmit multiple different data packets, the multiple data packets share the same HARQ process number and each of the multiple UL subframes corresponds to a 1-bit NDI, a location of a retransmitted packet corresponding to a data packet of the multiple data packets in the multiple UL subframes being the same as a location of the data packet in the multiple UL subframes during first transmission; and when multiple data packets having the same data are transmitted in the multiple UL subframes, or the multiple data packets which are of different redundancy versions but have the same data are transmitted in the plurality of UL subframes, the multiple data packets share the same HARQ process number.

In an embodiment, when both new data packets and a retransmitted packet are transmitted in the multiple UL subframes, each of the multiple UL subframes may be scheduled to correspond to a HARQ process number and/or NDI in a UL grant, the an HARQ process number of the retransmitted packet being the same as an HARQ process number of the data packet corresponding to the retransmitted packet during first transmission.

In an embodiment, when one of the multiple UL subframes transmits two data packets, the two data packets share the same HARQ process number and a DCI format 4 is adopted for first transmission of one of the two data packets, if one of the two data packets is failed to be transmitted, a DCI format 0 may be adopted to schedule a retransmitted packet corresponding to the data packet which is failed to be transmitted; if both of the two data packets are failed to be transmitted, the DCI format 4 may be adopted to schedule two retransmitted packets corresponding to the two data packets in the same UL subframe; and when each of the two data packets has a HARQ process number, the retransmitted packet corresponding to each of the two data packets may be independently scheduled.

According to an aspect of the disclosure, a method for transmitting data is provided, which includes that: scheduling information sent by a base station is received in a downlink subframe, the scheduling information being used to indicate an UE to transmit UL data in at least one UL subframe on an unlicensed carrier; and the UL data is transmitted to the base station in at least one UL subframe according to the scheduling information.

In an embodiment, when multiple UEs are to be scheduled by the base station schedules, the multiple UEs may be scheduled in one of the following manners: a first manner: a same set of UEs are scheduled in all of the multiple UL subframes; and a second manner: a different set of UEs are scheduled in each of the multiple UL subframes.

In an embodiment, when the UE is scheduled in the first manner, the operation that the scheduling information sent by the base station is received in the downlink subframe may include that: a broadcast message is received in the downlink subframe to receive the scheduling information sent by the base station.

In an embodiment, the broadcast message may include common DCI.

In an embodiment, when the UE is scheduled in the first manner, the operation that the scheduling information sent by the base station is received in the downlink subframe may include that: the scheduling information sent by the base station is received in the downlink subframe through a PDCCH-specific search space or ePDCCH-specific search space.

In an embodiment, the scheduling information may include at least one of the following information: a backoff value of random backoff of CCA; a value of a CW; a CCA type; locations of the multiple UL subframes; a number of continuously scheduled subframes; a length of a scheduled UL burst; first indication information used to indicate an UL subframe in which at least one symbol is reserved or kept blank in the multiple UL subframes; second indication information used to indicate a number of the reserved or blank symbols; and the number of symbols occupied by data in each UL subframe or last UL subframe in the multiple UL subframes.

In an embodiment, the CCA type may be related to an MCOT and a scheduling manner; when the scheduling manner is self-scheduling and the at least one UL subframe and the downlink subframe belong to the same MCOT, the CCA type may be CCA of a predefined detection duration;

when the scheduling manner is self-scheduling and the at least one UL subframe and the downlink subframe do not belong to the same MCOT, the CCA type may be CCA of multiple detections with random backoff; and when cross-carrier scheduling is adopted, the CCA type may be CCA of multiple detections with random backoff.

In an embodiment, the backoff value of random backoff of CCA or the value of the CW may be determined according to at least one of: the number of continuously scheduled UL subframes, the backoff value of random backoff of CCA or the value of the CW being larger if the number of the continuously scheduled UL subframes is larger; a backoff value of random backoff of CCA corresponding to one of the plurality of UL subframes at a lowest quality of service (QoS) level; or a value of a CW of CCA corresponding to one of the plurality of UL subframes at a lowest QoS level.

In an embodiment, when the same set of UEs are scheduled in all of the multiple UL subframes, the number of the continuously scheduled subframes may be determined through one of the multiple UEs with a minimum BSR.

In an embodiment, when a new UE is scheduled during the multiple UL subframes or the different set of UEs are scheduled in each of the multiple UL subframes, at least one of the first indication information or the second indication information sent by the base station may be received.

In an embodiment, a location of the subframe where the at least one blank symbol is located may be indicated in a bitmap manner.

In an embodiment, the blank symbol may be at least one of: a last symbol in a previous subframe of the first one of the multiple UL subframes where the newly scheduled UE is scheduled; a first symbol in the first one of the multiple UL subframes where the newly scheduled UE is scheduled; a first symbol in the first one of the multiple UL subframes; and a last symbol in the last one of the multiple UL subframes.

In an embodiment, DCIs corresponding to the multiple UL subframes may be a same DCI or different DCIs; when the DCIs corresponding to the multiple UL subframes are the same DCI, the DCIs corresponding to the multiple UL subframes may be born through a PDCCH or an ePDCCH; and when the DCIs corresponding to the multiple UL subframes are different DCIs, the DCI corresponding to each of the multiple UL subframes may be independently coded and the DCIs corresponding to the multiple UL subframes may be born through multiple PDCCHs or ePDCCHs or the DCIs corresponding to the multiple UL subframes may be jointly coded and the DCIs corresponding to the multiple UL subframes may be born through a PDCCH or an ePDCCH.

In an embodiment, under at least one of the following conditions, the DCI corresponding to each of the multiple UL subframes may be independently coded and the DCIs corresponding to the multiple UL subframes may be born through multiple PDCCHs or ePDCCHs or the DCIs corresponding to the multiple UL subframes may be jointly coded and the DCIs corresponding to the multiple UL subframes may be born through a PDCCH or an ePDCCH: the multiple UL subframes are discontinuous; the multiple UL subframes belong to different TXOPs; the multiple UL subframes belong to different UL bursts; the multiple UL subframes are spaced by at least one downlink subframe; or when two adjacent UL subframes of the plurality of UL subframes are spaced by a plurality of subframes, a number of the plurality of subframes being larger than a predetermined value.

In an embodiment, under at least one of the following conditions, the DCIs corresponding to the multiple UL subframes may be born through a PDCCH or an ePDCCH: the multiple UL subframes are continuous; or the multiple UL subframes belong to the same TXOP.

In an embodiment, when the DCI corresponding to each of the multiple UL subframes is independently coded and the DCIs corresponding to the multiple UL subframes are born through multiple PDCCHs or ePDCCHs, the PDCCH or ePDCCH corresponding to each of the multiple UL subframes may be determined in at least one of the following manners:

determining the PDCCH or ePDCCH corresponding to each of the multiple UL subframes through indication information of the at least one UL subframe, the indication information including offsets of the at least one UL subframe relative to the downlink subframe; and determining the PDCCH or ePDCCH corresponding to each of the multiple UL subframes through a minimum control channel element (CCE) index in the PDCCH or ePDCCH corresponding to each UL subframe.

In an embodiment, when the DCI corresponding to each of the multiple UL subframes is independently coded and the DCIs corresponding to the multiple UL subframes are born through multiple PDCCHs or ePDCCHs, the number of times for which the UE performs blind detection on the PDCCHs or ePDCCHs may be reduced in at least one of the following manners.

The number of the multiple UL subframes or the length of the UL burst is predefined; the same DCI format is adopted for multiple UL grants; and the search space is reduced.

In an embodiment, each of the multiple UL subframes may transmit a data packet, and the data packet transmitted in each of the multiple UL subframes and at least one of a HARQ process number or NDI of the data packet transmitted in each UL subframe may be determined in one of the following manners.

when the multiple UL subframes transmit multiple different data packets, each of the multiple data packets has an independent HARQ process number; when the multiple UL subframes transmit multiple different data packets, the multiple data packets share the same HARQ process number and each one of the multiple UL subframes corresponds to a 1-bit NDI, a location of a retransmitted packet corresponding to a data packet of the multiple data packets in the multiple UL subframes being the same as a location of the data packet in the multiple UL subframes during first transmission; and when multiple data packets having the same data are transmitted in the multiple UL subframes, or the multiple data packets which are of different redundancy versions but have the same data are transmitted in the multiple UL subframes, the multiple data packets share the same HARQ process number.

In an embodiment, when both new data packets and a retransmitted packet are transmitted in the multiple UL subframes, each of the plurality of UL subframes is scheduled to correspond to at least one of a HARQ process number or NDI in an UL grant, an HARQ process number of the retransmitted packet being the same as an HARQ process number of the data packet corresponding to the retransmitted packet during first transmission.

In an embodiment, when one of the multiple UL subframes transmits two data packets, the two data packets share the same HARQ process number and a DCI format 4 is adopted for first transmission of one data packet in the two data packets, if one data packet in the two data packets is failed to be transmitted, a DCI format 0 may be adopted to schedule a retransmitted packet corresponding to the data packet which is failed to be transmitted; if both of the two data packets are failed to be transmitted, the DCI format 4 may be adopted to schedule two retransmitted packets corresponding to the two data packets in the same UL subframe; and when each of the two data packets has a HARQ process number, the retransmitted packet corresponding to each of the two data packets may be independently scheduled.

According to an aspect of the embodiments of the disclosure, a device for transmitting data is provided, which may include: a sending module, configured to send scheduling information to an UE in a downlink subframe, the scheduling information being used to indicate the UE to transmit UL data in at least one UL subframe on an unlicensed carrier; and a receiving module, configured to receive the UL data transmitted by the UE.

In an embodiment, the device may further include a scheduling module, configured to, when multiple UEs are to be scheduled by a base station, schedule the multiple UEs in one of the following manners: a first manner: a same set of UEs are scheduled in all of the multiple UL subframes; and a second manner: a different set of UEs are scheduled in each of the multiple UL subframes.

In an embodiment, the scheduling information may include at least one of the following information: a backoff value of random backoff of CCA; a value of a CW; a CCA type; locations of the multiple UL subframes; the number of continuously scheduled subframes; a length of a scheduled UL burst; first indication information configured to indicate the UL subframe in which at least one symbol is reserved or kept blank in the multiple UL subframes; second indication information configured to indicate the number of symbols which are reserved or kept blank; and the number of symbols occupied by data in each UL subframe or last UL subframe in the multiple UL subframes.

In an embodiment, the CCA type may be related to an MCOT and a scheduling manner; when the scheduling manner is self-scheduling and the at least one UL subframe and the downlink subframe belong to the same MCOT, the CCA type may be CCA of a predefined detection duration; when the scheduling manner is self-scheduling and the at least one UL subframe and the downlink subframe do not belong to the same MCOT, the CCA type may be CCA of multiple detections with random backoff; and when cross-carrier scheduling is adopted, the CCA type may be CCA of multiple detections with random backoff.

In an embodiment, the backoff value of random backoff of CCA or the value of the CW may be determined according to at least one of: the number of the continuously scheduled UL subframes, the backoff value of random backoff of CCA or the value of the CW being larger if the number of the continuously scheduled UL subframes is larger; a backoff value of random backoff of CCA corresponding to one of the plurality of UL subframes at a lowest quality of service (QoS) level; or a value of a CW of CCA corresponding to one of the plurality of UL subframes at a lowest QoS level.

In an embodiment, when the same set of UEs are scheduled in all of the multiple UL subframes, the number of the continuously scheduled subframes may be determined through one of the multiple scheduled UEs with a minimum BSR.

In an embodiment, the DCIs corresponding to the multiple UL subframes may be the same DCI or different DCIs; when DCIs corresponding to the multiple UL subframes are the same DCI, the DCIs corresponding to the multiple UL subframes may be born through a PDCCH or an ePDCCH; and when the DCIs corresponding to the multiple UL subframes are different DCIs, the DCI corresponding to each of the multiple UL subframes may be independently coded and the DCIs corresponding to the multiple UL subframes may be born through multiple PDCCHs or ePDCCHs or the DCIs corresponding to the multiple UL subframes may be jointly coded and the DCIs corresponding to the multiple UL subframes may be born through a PDCCH or an ePDCCH.

In an embodiment, under at least one of the following conditions, the DCI corresponding to each of the multiple UL subframes may be independently coded and the DCIs corresponding to the multiple UL subframes may be born through multiple PDCCHs or ePDCCHs or the DCIs corresponding to the multiple UL subframes may be jointly coded and the DCIs corresponding to the multiple UL subframes may be born through a PDCCH or an ePDCCH: the multiple UL subframes are discontinuous; the multiple UL subframes belong to different TXOPs; the multiple UL subframes belong to different UL bursts; the multiple UL subframes are spaced by at least one downlink subframe; or when two adjacent UL subframes of the plurality of UL subframes are spaced by a plurality of subframes, a number of the plurality of subframes being larger than a predetermined value.

In an embodiment, under at least one of the following conditions, the DCIs corresponding to the multiple UL subframes may be born through a PDCCH or an ePDCCH: the multiple UL subframes are continuous; or the multiple UL subframes belong to the same TXOP.

According to an aspect of the embodiments of the disclosure, a device for transmitting data is provided, which may include: a receiving module, configured to receive scheduling information sent by a base station in a downlink subframe, the scheduling information being used to indicate UE to transmit UL data in at least one UL subframe, scheduled in the downlink subframe, on the unlicensed carrier; and a transmission module, configured to transmit the UL data to the base station in the at least one UL subframe according to the scheduling information.

In an embodiment, the scheduling information may include at least one of the following information: a backoff value of random backoff of CCA; a value of a CW; a CCA type; locations of the multiple UL subframes; the number of continuously scheduled subframes; a length of a scheduled UL burst; the UL subframe in which at least one symbol is reserved or kept blank in the multiple UL subframes; indication information configured to indicate the number of symbols which are reserved or kept blank; and the number of symbols occupied by data in each UL subframe or last UL subframe in the multiple UL subframes.

In an embodiment, the CCA type may be related to an MCOT and a scheduling manner; when the scheduling manner is self-scheduling and the at least one UL subframe and the downlink subframe belong to the same MCOT, the CCA type may be CCA of a predefined detection duration; when the scheduling manner is self-scheduling and the at least one UL subframe and the downlink subframe do not belong to the same MCOT, the CCA type may be CCA of multiple detections with random backoff; and when cross-carrier scheduling is adopted, the CCA type may be CCA of multiple detections with random backoff.

In an embodiment, the backoff value of random backoff of CCA or the value of the CW may be determined according to at least one of: the number of the continuously scheduled UL subframes, the backoff value of random backoff of CCA or the value of the CW being larger if the number the number of the continuously scheduled UL subframes is larger; a backoff value of random backoff of CCA corresponding to one of the plurality of UL subframes at a lowest quality of service (QoS) level; or a value of a CW of CCA corresponding to one of the plurality of UL subframes at a lowest QoS level.

In an embodiment, when the same set of UEs are scheduled in all of the multiple UL subframes, the number of the continuously scheduled subframes may be determined through one of the multiple scheduled UEs with a minimum BSR.

In an embodiment, DCIs corresponding to the multiple UL subframes are a same DCI or different DCIs; when the DCIs corresponding to the multiple UL subframes are the same DCI, the DCIs corresponding to the multiple UL subframes may be born through a PDCCH or an ePDCCH; and when the DCIs corresponding to the plurality of UL subframes are different DCIs, the DCI corresponding to each of the multiple UL subframes may be independently coded and the DCIs corresponding to the multiple UL subframes may be born through multiple PDCCHs or ePDCCHs or the DCIs corresponding to the multiple UL subframes may be jointly coded and the DCIs corresponding to the multiple UL subframes may be born through a PDCCH or an ePDCCH.

In an embodiment, under at least one of the following conditions, the DCI corresponding to each of the multiple UL subframes may be independently coded and the DCIs corresponding to the multiple UL subframes may be born through multiple PDCCHs or ePDCCHs or the DCIs corresponding to the multiple UL subframes may be jointly coded and the DCIs corresponding to the multiple UL subframes may be born through a PDCCH or an ePDCCH: the multiple UL subframes are discontinuous; the multiple UL subframes belong to different TXOPs; the multiple UL subframes belong to different UL bursts; the multiple UL subframes are spaced by at least one downlink subframe; or when two adjacent UL subframes of the plurality of UL subframes are spaced by a plurality of subframes, a number of the plurality of subframes being larger than a predetermined value.

In an embodiment, under at least one of the following conditions, the DCIs corresponding to the multiple UL subframes may be born through a PDCCH or an ePDCCH: the multiple UL subframes are continuous; or the multiple UL subframes belong to the same TXOP.

In an embodiment, the device may further include a first determination module, configured to, when the DCI corresponding to each of the multiple UL subframes is independently coded and the DCIs corresponding to the multiple UL subframes are born through multiple PDCCHs or ePDCCHs, determine the PDCCH or ePDCCH corresponding to each of the multiple UL subframes in at least one of the following manners: determination through indication information of the at least one UL subframe, the indication information including offsets of the at least one UL subframe relative to the downlink subframe; and determination through a minimum CCE index in the PDCCH or ePDCCH corresponding to each UL subframe.

In an embodiment, the device may further include a blind detection module, configured to, when the DCI corresponding to each of the multiple UL subframes is independently coded and the DCIs corresponding to the multiple UL subframes are born through multiple PDCCHs or ePDCCHs, reduce the number of times for which the UE performs blind detection on the PDCCHs or ePDCCHs in at least one of the following manners: the number of the UL subframes or the length of the UL burst is predefined; the same DCI format is adopted for multiple UL grants; and the search space is reduced.

The embodiments of the disclosure further provide a computer storage medium, which stores a computer program, the computer program being used to execute the data transmission method of the embodiments of the disclosure.

According to the disclosure, the scheduling information is sent to the UE in the downlink subframe and the UL data sent by the UE in the at least one UL subframe on the unlicensed carrier indicated by the scheduling information is received. Therefore, the technical solution for multi-subframe scheduling is implemented on the unlicensed carrier, and the problem that there are no technical solutions for multi-subframe scheduling on the unlicensed carrier in the related art is solved.

BRIEF DESCRIPTION OF DRAWINGS

The accompanying drawings described herein are intended to provide a further understanding to the disclosure and constitute a part of the application. Schematic embodiments of the disclosure and descriptions thereof are adopted to explain the disclosure and do not mean to improperly limit to the disclosure. In the accompanying drawings.

DETAILED DESCRIPTION

The disclosure will be described below with reference to the drawings and in combination with the embodiments in detail. It is to be noted that the embodiments of the application and features in the embodiments may be combined without conflicts.

It is to be noted that terms "first", "second" and the like in the description, claims and drawings of the disclosure are adopted not to describe a specific sequence or order but to distinguish similar objects.

Figure 1:
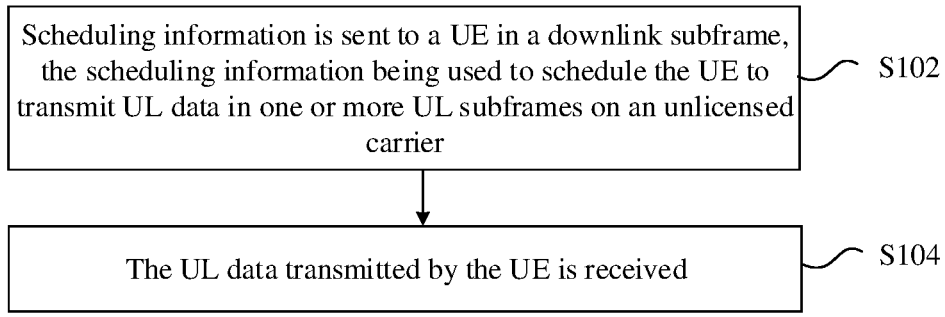
FIG. 1 is a first flowchart of a method for transmitting data according to an embodiment of the disclosure.

According to an embodiment, a method for transmitting data is provided. FIG. 1 is a first flowchart of a method for transmitting data according to an embodiment of the disclosure. As illustrated in FIG. 1, the method includes the following operations.

In S102, scheduling information is sent to an UE in a downlink subframe, the scheduling information being used to schedule the UE to transmit UL data in one or more UL subframes on an unlicensed carrier.

In S104, the UL data transmitted by the UE is received.

According to the above operations, the scheduling information is sent to the UE in the downlink subframe and the UL data sent by the UE in the one or more UL subframes on the unlicensed carrier indicated by the scheduling information is received. Therefore, the technical solution for multi-subframe scheduling is implemented on the unlicensed carrier, and the problem that there are no technical solutions for multi-subframe scheduling on the unlicensed carrier in the related art is solved.

In an embodiment of the disclosure, when multiple UEs are to be scheduled by a base station, the multiple UEs are scheduled in one of the following manners: a first manner: a same set of UEs are scheduled in all of the multiple UL subframes; and a second manner: a different set of UEs are scheduled in each of the multiple UL subframes.

It is to be noted that the first manner may be represented as follows: different UEs are scheduled in the same number of subframes, or the same set of UEs may be scheduled in all of the subframes. That is, different UEs are scheduled in the same number of subframes, and the same number of subframes may allow the same UE to send data.

The second manner may be represented as follows: different UEs are scheduled in different numbers of subframes, or the different set of UEs may be scheduled in each subframe. That is, different UEs are scheduled in different numbers of subframes, and different numbers of subframes allow different UEs to send data thereon.

It is to be noted that, when the UEs are scheduled in the first manner, S102 may be implemented as follows: the scheduling information is sent to the UE in the downlink subframe in a broadcast manner. The broadcast manner may include common DCI. For example, the scheduling information may be born through bit information in a DCI format 1C. It is to be noted that the broadcast manner may further include, but not limited to, a common search space. When the UEs are scheduled in the second manner, S102 may be implemented as follows: the scheduling information sent by the base station is received in the downlink subframe through a PDCCH-specific search space or ePDCCH-specific search space.

It is to be noted that the scheduling information may include at least one of: a backoff value of random backoff of CCA; a value of a CW; a CCA type; locations of the multiple UL subframes; the number of scheduled subframes; a length of a scheduled UL burst; a location of an ending symbol in a last one of the multiple UL subframes; HARQ process number information; or NDI information.

In the embodiment of the disclosure, the CCA type is related to an MCOT and a scheduling manner. When the scheduling manner is self-scheduling and the one or more UL subframes and the downlink subframe belong to the same MCOT, the CCA type is a CCA of a predefined detection duration.

When the scheduling manner is self-scheduling and the one or more UL subframes and the downlink subframe do not belong to the same MCOT, the CCA type is a CCA of multiple detections with g random backoff.

When cross-carrier scheduling is adopted, the CCA type is the CCA of multiple detections with random backoff.

The backoff value of random backoff of CCA or the value of the CW may be determined according to at least one of: the number of the continuously scheduled UL subframes, a backoff value of random backoff of CCA corresponding to one of the plurality of UL subframes at a lowest quality of service (QoS) level, or a value of a CW of CCA corresponding to one of the plurality of UL subframes at a lowest QoS level, the more the number of the continuously scheduled UL subframes is, the larger the backoff value of random backoff of CCA or the value of the CW is. For example, the backoff value or the value of the CW is determined according to the number of the continuously scheduled UL subframes. If one UL subframe is scheduled, the CW is 1 and the backoff value is 1 or 0. If two UL subframes are scheduled, the CW is 3. If three UL subframes or four UL subframes are scheduled, the CW is 7. However, there are no limits made.

In an embodiment of the disclosure, when the UEs are scheduled in the first manner, the number of the continuously scheduled subframes may be determined through one of the multiple scheduled UEs with a minimum BSR. When a new UE is scheduled during the multiple UL subframes or the UEs are scheduled in the second manner, at least one of first indication information or second indication information is sent to the UE, the first indication information is used for indicating the UL subframe in which at least one symbol is reserved or kept blank in the multiple UL subframes, the second indication information is used for indicating the number of the reserved or blank symbols.

It is to be noted that a location of the subframe where the at least one blank symbol is located may be indicated in, but not limited to, a bitmap manner. The at least one blank symbol may be at least one of: a last symbol in a previous subframe of the first one of the one or more UL subframes where the newly scheduled UE is scheduled; a first symbol in the first one of one or more UL subframes where the newly scheduled UE is scheduled; a first symbol in the first one of the multiple UL subframes; or a last symbol in the last one of the multiple UL subframes. It is to be noted that the number of blank subframes may also be indicated through a bitmap, which may be represented in, but not limited to, the following manner. States of each scheduled UL subframe may be indicated using multiple bits in the bitmap. For example, two bits are adopted to indicate three states: 00 represents that no symbols are required to be reserved in the UL subframe, 01 represents that one symbol is required to be reserved in the UL subframe and 10 represents that two symbols are required to be reserved in the UL subframe. Similarly, the number of the blank symbols may also be indicated through location information of the one or more UL subframes in the MCOT. That is, the number of the blank symbols is indicated through the location information of the scheduled subframe in the MCOT. For example, when the scheduled subframe belongs to the MCOT, one symbol is kept blank. When the scheduled subframe does not belong to the MCOT, two symbols are kept blank.

In an embodiment of the disclosure, DCIs corresponding to the multiple UL subframes are the same DCI or different DCIs. The DCIs corresponding to the multiple UL subframes may be born in the following manners. In a first bearing manner, under the condition that the DCIs corresponding to the multiple UL subframes are the same DCI, the DCIs corresponding to the multiple UL subframes are born through a PDCCH or an ePDCCH. In a second bearing manner, under the condition that the DCIs corresponding to the multiple UL subframes are different DCIs, the DCI corresponding to each of the multiple UL subframes is independently coded and the DCIs corresponding to the multiple UL subframes are born through multiple PDCCHs or ePDCCHs. In a third bearing manner, under the condition that the DCIs corresponding to the multiple UL subframes are different DCIs, the DCIs corresponding to the multiple UL subframes are jointly coded and the DCIs corresponding to the multiple UL subframes are born through a PDCCH or an ePDCCH.

It is to be noted that the DCIs corresponding to the multiple UL subframes are the same DCI represents that UL grants of the multiple UL subframes are the same UL grant, and the DCIs corresponding to the multiple UL subframes are different DCIs represents that each of the multiple UL subframes has an independent UL grant. For the first bearing manner, the UE is only required to detect one UL grant in a certain downlink subframe. For the third bearing manner, the UE may obtain the scheduling information of the multiple subframes by detecting only one PDCCH or ePDCCH. For the second bearing manner, the UE may perform blind detection on multiple PDCCHs or ePDCCHs in one downlink subframe. In these bearing manners, the UE may obtain multiple UL grants in one downlink subframe, UL data transmission efficiency may further be improved, and a signaling overhead may be reduced.

It is to be noted that the second bearing manner or the third bearing manner may be adopted under at least one of the following conditions: the multiple UL subframes are discontinuous; the multiple UL subframes belong to different TXOPs; the multiple UL subframes belong to different UL bursts; the multiple UL subframes are spaced by at least one downlink subframe; or when two adjacent UL subframes of the plurality of UL subframes are spaced by a plurality of subframes, a number of the plurality of subframes being larger than a predetermined value. The first bearing manner may be adopted under at least one of the following conditions: the multiple UL subframes are continuous, or the multiple UL subframes belong to the same TXOP.

In an embodiment of the disclosure, each UL subframe in the multiple UL subframes transmits a data packet, and the data packet transmitted in each of the multiple UL subframes and at least one of a HARQ process number or NDI of the data packet transmitted in each UL subframe are determined in one of the following manners.

When the multiple UL subframes transmit multiple different data packets, each of the multiple data packets has an independent HARQ process number; when the multiple UL subframes transmit multiple different data packets, the multiple data packets share the same HARQ process number and each of the multiple UL subframes corresponds to a 1-bit NDI, a location of a retransmitted packet corresponding to a data packet of the multiple data packets in the multiple UL subframes being the same as a location of the data packet in the multiple UL subframes during first transmission; when multiple data packets having the same data are transmitted in the multiple UL subframes, or the multiple data packets which are of different redundancy versions but have the same data are transmitted in the multiple UL subframes, the multiple data packets share the same HARQ process number. When both new data packets and a retransmitted packet are transmitted in the multiple UL subframes, each of the multiple UL subframes is scheduled to correspond to at least one of a HARQ process number or NDI in an UL grant, the HARQ process number of the retransmitted packet being the same as HARQ process number of the data packet corresponding to the retransmitted packet during first transmission. Under the condition that a UL subframe in the multiple UL subframes transmits two data packets, the two data packets share the same HARQ process number and a DCI format 4 is adopted for first transmission of one data packet in the two data packets, if one data packet in the two data packets is failed to be transmitted, a DCI format 0 is adopted to schedule a retransmitted packet corresponding to the data packet which is failed to be transmitted; if both of the two data packets are failed to be transmitted, the DCI format 4 is adopted to schedule two retransmitted packets corresponding to the two data packets in the same UL subframe; and under the condition that each data packet in the two data packets has a HARQ process number, the retransmitted packet corresponding to each data packet in the two data packets is independently scheduled.

It is to be noted that an execution body of the method may be, but not limited to, the base station.

According to the method, the problem of reduction in the UL data transmission efficiency in the related art is solved, and the effects of reducing the signaling overhead and increasing a UL transmission rate on an unlicensed spectrum are further achieved. In addition, multi-user multiplexing under continuous scheduling is further implemented, and flexibility and the efficiency are improved.

Figure 2:
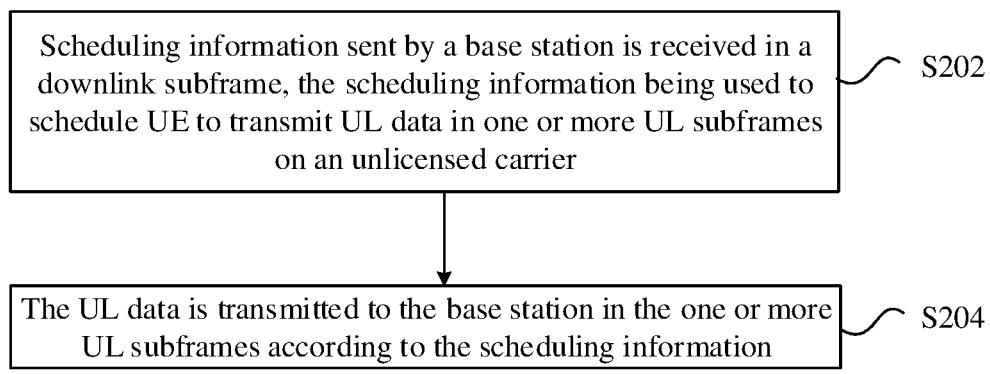
FIG. 2 is a second flowchart of a method for transmitting data according to an embodiment of the disclosure.

According to an embodiment, a method for transmitting data is provided. FIG. 2 is a second flowchart of a method for transmitting data according to an embodiment of the disclosure. As illustrated in FIG. 2, the method includes the following operations.

In S202, scheduling information sent by a base station is received in a downlink subframe, the scheduling information being used for indicating the UE to transmit UL data in one or more UL subframes on an unlicensed carrier.

In S204, the UL data is transmitted to the base station in the one or more UL subframes according to the scheduling information.

According to the above operations, the scheduling information sent by the base station is received in the downlink subframe and the UL data is transmitted to the base station in the one or more UL subframes on the unlicensed carrier according to the scheduling information. Therefore, the technical solution for multi-subframe scheduling is implemented on the unlicensed carrier, and the problem that there are no technical solutions for multi-subframe scheduling on the unlicensed carrier in the related art is solved.

In an embodiment of the disclosure, when multiple UEs are to be scheduled by a base station, the multiple UEs are scheduled in one of the following manners: a first manner: a same set of UEs are scheduled in all of the multiple UL subframes; and a second manner: a different set of UEs are scheduled in each of the multiple UL subframes.

It is to be noted that the first manner may be represented as follows: different UEs are scheduled in the same number of subframes, or the same set of UEs may be scheduled in all of the subframes. That is, different UEs are scheduled in the same number of subframes, and the same number of subframes may allow the same UE to send data. The second manner may be represented as follows: different UEs are scheduled in different numbers of subframes, or the different set of UEs may be scheduled in each subframe. That is, different UEs are scheduled in different numbers of subframes, and different numbers of subframes allow different UEs to send data thereon.

It is to be noted that, when the UEs are scheduled in the first manner, S202 may be implemented as follows: a broadcast message is received in the downlink subframe to receive the scheduling information sent by the base station. The broadcast message may include common DCI. For example, the scheduling information may be born through bit information in a DCI format 1C. However, there are no limits. For example, the broadcast message may include a common search space and the like. When the UEs are scheduled in the second manner, S202 may be implemented as follows: the scheduling information sent by the base station is received in the downlink subframe through a PDCCH-specific search space or ePDCCH-specific search space.

It is to be noted that the scheduling information may include at least one of: a backoff value of random backoff of CCA; a value of a CW; a CCA type; locations of the multiple UL subframes; the number of scheduled subframes; a length of a scheduled UL burst; a location of an ending symbol in the last one of the multiple UL subframes; HARQ process number information; or NDI information.

In the embodiment of the disclosure, the CCA type is related to an MCOT and a scheduling manner. When the scheduling manner is self-scheduling and the one or more UL subframes and the downlink subframe belong to the same MCOT, the CCA type is a CCA of a predefined detection duration.

When the scheduling manner is self-scheduling and the one or more UL subframes and the downlink subframe do not belong to the same MCOT, the CCA type is a CCA of multiple detections with random backoff. When cross-carrier scheduling is adopted, the CCA type is the CCA of multiple detections with random backoff. The backoff value of random backoff of CCA or the value of the CW may be determined according to at least one of: the number of the continuously scheduled UL subframes, a backoff value of random backoff of CCA corresponding to one of the plurality of UL subframes at a lowest quality of service (QoS) level, or a value of a CW of CCA corresponding to one of the plurality of UL subframes at a lowest QoS level; the larger the number of the continuously scheduled UL subframes is, the larger the backoff value of random backoff of CCA or the value of the CW is. For example, the backoff value or the value of the CW is determined according to the number of the continuously scheduled UL subframes. If one UL subframe is scheduled, the CW is 1 and the backoff value is 1 or 0. If two UL subframes are scheduled, the CW is 3. If three UL subframes or four UL subframes are scheduled, the CW is 7. However, there are no limits made.

In an embodiment of the disclosure, when the UEs are scheduled in the first manner, the number of the continuously scheduled subframes may be determined through one of the multiple scheduled UEs with a minimum BSR. When new UE is scheduled during the multiple UL subframes or the UEs are scheduled in the second manner, at least one of the first indication information or the second indication information sent by the base station is received.

It is to be noted that a location of the subframe where the at least one blank symbol is located is indicated in a bitmap manner. The at least one blank symbol may be at least one of: a last symbol in a previous subframe of the first UL subframe in the one or more UL subframes where the newly scheduled UE is scheduled; a first symbol in the first UL subframe in the one or more UL subframes where the newly scheduled UE is scheduled; a first symbol in the first UL subframe in the multiple UL subframes; or a last symbol in the last UL subframe in the multiple UL subframes.

The second indication information may include at least one of: a bitmap; or location information of the one or more UL subframes in the MCOT. Indicating the number of blank subframes through the bitmap may be represented in, but not limited to, the following manner. States of each scheduled UL subframe may be indicated through multiple bits in the bitmap. For example, two bits are adopted to indicate three states: 00 represents that no symbols are required to be reserved in the UL subframe, 01 represents that one symbol is required to be reserved in the UL subframe and 10 represents that two symbols are required to be reserved in the UL subframe. The number of the blank symbols is indicated through location information of the one or more UL subframes in the MCOT. That is, the number of the blank symbols is indicated through the location information of the scheduled subframe in the MCOT. For example, when the scheduled subframe belongs to the MCOT, one symbol is kept blank. When the scheduled subframe does not belong to the MCOT, two symbols are kept blank.

In an embodiment of the disclosure, DCIs corresponding to the multiple UL subframes are the same DCI or different DCIs. The DCIs corresponding to the multiple UL subframes may be born in the following manners. In a first bearing manner, under the condition that the DCIs corresponding to the multiple UL subframes are the same DCI, the DCIs corresponding to the multiple UL subframes are born through a PDCCH or an ePDCCH. In a second bearing manner, under the condition that the DCIs corresponding to the multiple UL subframes are different DCIs, the DCI corresponding to each of the multiple UL subframes is independently coded and the DCIs corresponding to the multiple UL subframes are born through multiple PDCCHs or ePDCCHs. In a third bearing manner, under the condition that the DCIs corresponding to the multiple UL subframes are different DCIs, the DCIs corresponding to the multiple UL subframes are jointly coded and the DCIs corresponding to the multiple UL subframes are born through a PDCCH or an ePDCCH.

It is to be noted that the DCIs corresponding to the multiple UL subframes are the same DCI represents that UL grants of the multiple UL subframes are the same UL grant, and the DCIs corresponding to the multiple UL subframes are different DCIs represents that each UL subframe of the multiple UL subframes has an independent UL grant. For the first bearing manner, the UE is only required to detect one UL grant in a certain downlink subframe. For the third bearing manner, the UE may obtain the scheduling information of the multiple subframes by detecting only one PDCCH or ePDCCH. For the second bearing manner, the UE may perform blind detection on multiple PDCCHs or ePDCCHs in one downlink subframe. In these bearing manners, the UE may obtain multiple UL grants in one downlink subframe, UL data transmission efficiency may further be improved, and a signaling overhead may be reduced.

It is to be noted that the second bearing manner or the third bearing manner may be adopted under at least one of the following conditions: the multiple UL subframes are discontinuous; the multiple UL subframes belong to different TXOPs; the multiple UL subframes belong to different UL bursts; the multiple UL subframes are spaced by at least one downlink subframe; or when two adjacent UL subframes of the plurality of UL subframes are spaced by a plurality of subframes, a number of the plurality of subframes being larger than a predetermined value. The first bearing manner may be adopted under at least one of the following conditions: the multiple UL subframes are continuous; or the multiple UL subframes belong to the same TXOP.

In an embodiment of the disclosure, when the second bearing manner is adopted, the PDCCH or ePDCCH corresponding to each UL subframe in the multiple UL subframes may be determined in at least one of the following manners: determining the PDCCH or ePDCCH corresponding to each of the multiple UL subframes through indication information of the one or more UL subframes, the indication information including offsets of the one or more UL subframes relative to the downlink subframe; or determining the PDCCH or ePDCCH corresponding to each UL subframe in the multiple UL subframes through a minimum CCE index in the PDCCH or ePDCCH corresponding to each UL subframe.

For example, when the indication information includes the offsets of the one or more UL subframes relative to the downlink subframe, for example, the downlink subframe is an $n^{th}$ subframe, the $n^{th}$ subframe being a subframe where the corresponding UL grant is sent, 00 represents DCI or PDCCH or ePDCCH corresponding to an $(n+4)^{th}$ subframe, 01 represents DCI or PDCCH or ePDCCH corresponding to an $(n+5)^{th}$ subframe, 10 represents DCI or PDCCH or ePDCCH corresponding to an $(n+6)^{th}$ subframe and 11 represents DCI or PDCCH or ePDCCH corresponding to an $(n+7)^{th}$ subframe. There are no limits.

In an embodiment of the disclosure, when the second bearing manner is adopted, the number of times for which the UE performs blind detection on the PDCCHs or ePDCCHs is reduced in at least one of the following manners: the number of the multiple UL subframes or the length of the UL burst is predefined; the same DCI format is adopted for multiple UL grants; or the search space is reduced. By using these manners, complexity in blind detection of multiple UL grants in one downlink subframe is reduced.

In an embodiment of the disclosure, each of the multiple UL subframes transmits a data packet and the data packet transmitted in each of the multiple UL subframes and at least one of a HARQ process number or NDI of the data packet transmitted in each UL subframe are determined in one of the following manners. Under the condition that the multiple UL subframes transmit multiple different data packets, each of the multiple data packets has an independent HARQ process number. Under the condition that the multiple UL subframes transmit multiple different data packets, the multiple data packets share the same HARQ process number and each of the multiple UL subframes corresponds to a 1-bit NDI, a location of a retransmitted packet corresponding to one of the multiple data packets in the multiple UL subframes being the same as a location of the data packet corresponding to the retransmitted packet in the multiple UL subframes during first transmission. Under the condition that multiple data packets having the same data are transmitted in the multiple UL subframes, or the multiple data packets which are of different redundancy versions but have the same data are transmitted in the multiple UL subframes, the multiple data packets share the same HARQ process number. When there are new data packets and retransmitted packets in the multiple UL subframes, each of the multiple UL subframes is scheduled to correspond to at least one of a HARQ process number or NDI in an UL grant, the HARQ process numbers of the retransmitted packets being the same as HARQ process numbers of the data packets corresponding to the retransmitted packets during first transmission. Under the condition that an UL subframe in the multiple UL subframes transmits two data packets, the two data packets share the same HARQ process number and a DCI format 4 is adopted for first transmission of one data packet in the two data packets, if one data packet in the two data packets is failed to be transmitted, a DCI format 0 is adopted to schedule a retransmitted packet corresponding to the data packet which is failed to be transmitted; if both of the two data packets are failed to be transmitted, the DCI format 4 is adopted to schedule two retransmitted packets corresponding to the two data packets in the same UL subframe; and under the condition that each data packet in the two data packets has a HARQ process number, the retransmitted packet corresponding to each data packet in the two data packets is independently scheduled.

It is to be noted that an execution body of the steps may be, but not limited to, the UE.

According to the method, the problem of reduction in the UL data transmission efficiency in the related art is solved, and the effects of reducing the signaling overhead and increasing a UL transmission rate of an unlicensed spectrum are further achieved. In addition, multi-user multiplexing under continuous scheduling is further implemented, and flexibility and the efficiency are improved.

For better understanding the disclosure, the disclosure will further be explained below in combination with embodiments.

The disclosure provides an embodiment of a method for transmitting data. The method mainly includes that: a base station schedules multiple UEs for UL data transmission in at least one subframe in one of the following manners. A first manner (equivalent to the first manner in the abovementioned embodiments): the base station simultaneously schedules different UEs for data transmission in the same number of subframes, or a same set of UEs are scheduled in each subframe. A second manner (equivalent to the second manner in the abovementioned embodiments): the base station simultaneously schedules different UEs for data transmission in different numbers of subframes, or a different set of UEs are scheduled in each subframe.

When the first manner is adopted, the base station may bear some common configuration parameters of the simultaneously scheduled UEs in a common search space through, for example, some bit information in a DCI format 1C. The information includes at least one of first information, second information, third information, or fourth information. The first information may include a value of N of random backoff of CCA or a value of a CW, or a CCA type. The second information may include locations of the scheduled subframes or the number of continuous subframes, or a length of a scheduled UL burst. The third information may include the scheduled subframes which are notified to the UE by the base station and in which a resource of at least one symbol is reserved when a different set of UEs are multiplexed by two continuous subframes. The fourth information may include an indication about the number of reserved or blank symbols or the number of symbols occupied by data in each scheduled subframe or the last scheduled subframe.

When the UEs are scheduled by different numbers of subframes or a different set of UEs are scheduled on each subframe, the above information is born through a specific search space. The CCA type is related to an MCOT and a scheduling manner. When self-scheduling is adopted and the scheduled UL subframes and the corresponding downlink subframe sent by the base station belong to the same MCOT initiated by the base station, a CCA manner is CCA of a predefined detection duration. When the scheduled UL subframes do not belong to the MCOT initiated by the base station, the CCA manner is a CCA manner of multiple detections with random backoff. When cross-carrier scheduling is adopted, a CCA manner of cat4 including random backoff is adopted. The value of the CW or N of CCA is related to the number of the continuously scheduled subframes. Or the value of the CW or N of CCA executed by the UE is determined by the base station according to CCA parameters corresponding to one of the multiple subframes with a lowest QoS level.

For each scheduled UE, the following scheduling manner may be adopted. The base station sends indication information in a downlink subframe on a licensed carrier or an unlicensed carrier contented by the base station, the indication information is used for scheduling the UE to transmit UL data in one or more continuous subframes on the unlicensed carrier In the multiple subframes, different data packets are transmitted or data packets of different redundancy versions but have the same data are transmitted. When different data packets are transmitted in the multiple subframes, each data packet has an independent HARQ process number. When data packets of different redundancy versions but have the same data are transmitted in the multiple subframes, the same process number is shared.

DCIs of the multiple subframes are completely the same, or the DCI of each subframe is different and the DCIs of all of the different subframes are born through a PDCCH or an ePDCCH in a joint coding manner, or the DCIs of different subframes are born through different PDCCHs or ePDCCHs.

When multiple UL subframes are simultaneously scheduled by the downlink subframe and the multiple UL subframes are discontinuous or belong to different TXOPs or belong to different bursts or are spaced by at least one downlink subframe or the number of the subframes therebetween is larger than a predefined value, a multi-subframe scheduling manner with multiple UL grants included in a downlink subframe is adopted.

When the multiple scheduled subframes are continuous or belong to the same TXOP, a multi-subframe scheduling manner that multiple subframes are scheduled by a downlink subframe through a UL grant is preferred. When a certain subframe does not receive the indication information about the blank symbols and an MCOT is not exceeded, the UE may implement continuous transmission in the multiple scheduled subframes after the CCA is successful.

When multiple pieces of scheduling information sent by the base station in the downlink subframe are born through multiple PDCCHs or ePDCCHs, the UE determines the PDCCH or ePDCCH corresponding to each scheduled subframe in at least one of the following manners. A first manner: the PDCCH or ePDCCH corresponding to each scheduled subframe is determined through received scheduled subframe indication information. A second manner: explicit mapping of the corresponding scheduled subframe through a minimum CCE index of DCI corresponding to the UL grant corresponding to the scheduled subframe.

When the multiple pieces of scheduling information sent by the base station in the downlink subframe are born through multiple PDCCHs or ePDCCHs, the number of times for which the UE performs blind detection on the PDCCHs or the ePDCCHs is reduced in at least one of the following manners. A first manner: the number of subframes during multi-subframe scheduling of each time or a length of a UL burst is predefined, thereby determining the number of the PDCCHs or the ePDCCHs. A second manner: multiple pieces of DCIs are in the same format. A third manner: the search space is reduced, including reducing a supported aggregation level or reducing a DCI size.

When cross-carrier scheduling of the unlicensed carrier on a licensed carrier is configured for the UE, the licensed carrier and the unlicensed carrier share the same search space, or the EPDCCH or ePDCCH is adopted during self-scheduling.

According to the disclosure, the scheduling information is configured according to a predetermined unlicensed UL subframe scheduling manner, the scheduling information being used for indicating UE to transmit UL data on an unlicensed spectrum, and the UL data sent by the UE is received according to the scheduling information. Therefore, the problem of reduction in the UL data transmission efficiency due to adoption of a technology for increasing a UL transmission rate of the unlicensed carrier in the related art is solved, and the effects of reducing a signaling overhead and increasing the UL transmission rate of the unlicensed spectrum are further achieved. In addition, multi-user multiplexing under continuous scheduling is further implemented, and flexibility and efficiency are improved.

The disclosure further provides another method for transmitting data, which includes that: UE receives related indication information for indicating CCA and data transmission from a base station, performs CCA and then performs data transmission according to the indication information after the CCA is successful.

It is to be noted that the indication information is used for indicating the UE to perform data transmission in one or more UL subframes. The indication information is sent on a carrier where the data transmission is performed or on another carrier. In case of scheduling in the present carrier, the indication information and the scheduled data subframes belong to the same MCOT or belong to different MCOTs.

A base station simultaneously schedules multiple UEs for UL data transmission in at least one subframe in one of the following manners.

A first manner: the base station simultaneously schedules different UEs for data transmission in the same number of subframes. A second manner: the base station simultaneously schedules different UEs for data transmission in different numbers of subframes.

When the same number of subframes are adopted for the multiple UEs which are simultaneously scheduled, the base station sends partial scheduling indication information to the scheduled UE through a common DCI format 1C.

The indication information includes at least one of first information, second information, third information or fourth information. The first information includes a value of N of random backoff of CCA or a value of a CW, or a CCA type, the CCA type including CCA of a detection and CCA of multiple detections. The second information includes locations of the scheduled subframes or the number of continuous subframes, or a length of a scheduling UL burst. The third information includes the scheduled subframe which is notified to the UE and in which at least one Single Carrier-Orthogonal Frequency Division Multiple Access (SC-OFDMA) symbol is reserved or kept blank for other UE to execute CCA. The fourth information includes the number of blank symbols in the subframe in which the symbols are required to be reserved or the number of symbols occupied by data of each scheduled subframe or the last scheduled subframe.

When different numbers of subframes scheduled for the multiple UEs which are simultaneously scheduled, the base station notifies a related CCA parameter, the number of the scheduled subframes and the subframe where the blank symbols are located through a specific search space and indicates the subframe where the blank symbols are located in a bitmap manner. When a new UE is scheduled during the multiple subframes scheduling the UE or a different set of UEs are scheduled by two subframes, the base station sends blank symbol indication information. The blank symbols are located at the end of a previous subframe of the first subframe on which the new UE is scheduled or located starting from the first symbol in the first scheduled subframe.

The subframes where UL data transmission is located correspond to the same DCI. Or the multiple subframes for data transmission correspond to different DCIs or some of DCIs corresponding to multiple subframes for data transmission are the same. Different DCI is independently coded and born through different PDCCHs or ePDCCHs. Or the multiple pieces of DCI are born through a PDCCH or an ePDCCH in a joint coding manner. Dedicated scheduling information of the UE is born through a PDCCH or an ePDCCH or is born through PDCCHs or ePDCCHs in a number less than or equal to the number of the scheduled subframes.

When the multiple scheduled subframes belong to more than one MCOT, the base station notifies the UE to change the CCA type into a CCA manner of multiple detections of Cat4.

When the base station indicates the CCA type of the UE or the related CCA parameter, the CW or N of CCA is related to the number of the continuously scheduled subframes. When the number of continuous transmission subframes is larger, the value of the CW or the value of N is larger.

When multiple pieces of scheduling information sent by the base station in the downlink subframe are born through multiple PDCCHs or ePDCCHs, the UE determines the PDCCH or ePDCCH corresponding to each scheduled subframe in at least one of the following manners. A first manner: determination through received scheduled subframe indication information. A second manner: explicit mapping of the corresponding scheduled subframe through a minimum CCE index of DCI corresponding to the UL grant corresponding to the scheduled subframe.

When the multiple pieces of scheduling information sent by the base station in the downlink subframe are born through multiple PDCCHs or ePDCCHs, the number of times for which the UE performs blind detection on the PDCCHs or the ePDCCHs is reduced in at least one of the following manners. A first manner: the number of subframes during multi-subframe scheduling of each time or a length of a UL burst is predefined, thereby determining the number of the UL grants. A second manner: the same format is adopted for multiple DCIs. A third manner: the search space is reduced, including reducing a supported aggregation level or reducing a DCI size. The number of the blank symbols or the number of symbols for data transmission in the scheduled subframes are determined according to a CCA parameter of other scheduled UE or explicitly determined according to the locations of the subframes.

When different data packets are born in each of the multiple subframes, each data packet has an independently HARQ process number. When the same data packet is born in all of the subframes, the same HARQ process number is shared. When different data packets share the same HARQ process number, a 1-bit NDI is defined for each subframe, and a location of a retransmitted packet in the multiple subframes is the same as a location of a packet corresponding to the retransmitted packet during first transmission.

When there are new data packets and retransmitted packets in the multiple subframes, each of the multiple subframes is at least scheduled to correspond to a different HARQ process number and/or different NDI in UL grants. HARQ process numbers of the retransmitted packets are the same as HARQ process numbers during first transmission. For a DCI format 4, when two Transport Blocks (TBs) of the scheduled subframe share the same HARQ process number and when the DCI format 4 is adopted for first transmission of a data packet during multi-subframe scheduling to send two flows in the same subframe, if an error occurs to a data packet in the two streams, a DCI format 0 may be adopted to schedule a retransmitted packet, and if both of the two streams are retransmitted, the DCI format 4 is adopted to schedule two retransmitted packets in the same subframe. For the DCI format 4, when each of the two TBs in the scheduled subframe has an independent HARQ process number, each of the retransmitted packets may be independently scheduled.

First Embodiment

A data transmission method is applied to an UE side and includes that: scheduling information transmitted by a base station is received in a subframe, the information being used to schedule UE for UL data transmission, and then the UE performs CCA and, after the CCA is successful, sends UL data. The scheduling information indicates the UE for transmission in one or more UL subframes or a Physical Uplink Shared Channel (PUSCH).

The multiple subframes may transmit data with different QoSs. Or data packets belonging to the same QoS are scheduled during scheduling of each time.

When a downlink subframe includes scheduling information of multiple UL subframes, the scheduling information of the multiple subframes may be born in the following three manners.

A first manner: UL grants of the multiple UL subframe are the same, that is, DCIs corresponding to the multiple UL subframes are the same, and only one PDCCH or ePDCCH is adopted. The UE may detect only one UL grant on a certain downlink subframe.

A second manner: each subframe of the multiple UL subframes has an independent UL grant and each UL grant is born through a PDCCH or an ePDCCH. That is, the DCI of each of the multiple subframes is independently coded. The UE is required to perform blind detection on multiple PDCCHs or ePDCCHs in the downlink subframe. The number of the PDCCHs or the ePDCCHs corresponds to the number of the scheduled subframes.

A third manner: each of the multiple UL subframes has an independent UL grant, but the DCIs of the multiple subframes are jointly coded and born through a PDCCH or an ePDCCH. The UE may detect only one PDCCH or ePDCCH to obtain the scheduling information of the multiple subframes.

Figure 3:
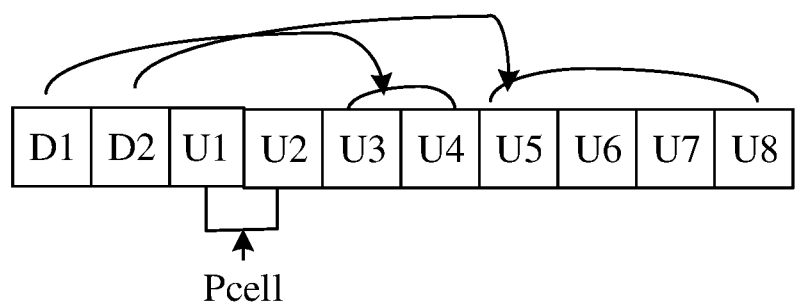
FIG. 3 is a first schematic diagram of multi-subframe scheduling according to an embodiment of the disclosure.

The PDCCH or ePDCCH for multi-subframe scheduling may be sent through a downlink subframe on the present carrier. That is, a self-carrier scheduling manner is adopted. The downlink subframe and the scheduled UL subframes belong to the same MCOT. FIG. 3 is a first schematic diagram of multi-subframe scheduling according to an embodiment of the disclosure. As illustrated in FIG. 3, a first downlink subframe of an MCOT schedules UL subframe 3 and UL subframe 4 of the MCOT and a second downlink subframe schedules UL subframe 5, UL subframe 6, UL subframe 7 and UL subframe 8 of the MCOT. The MCOT is a maximum occupation duration, for example, 10 ms or 8 ms or 4 ms.

Figure 4:
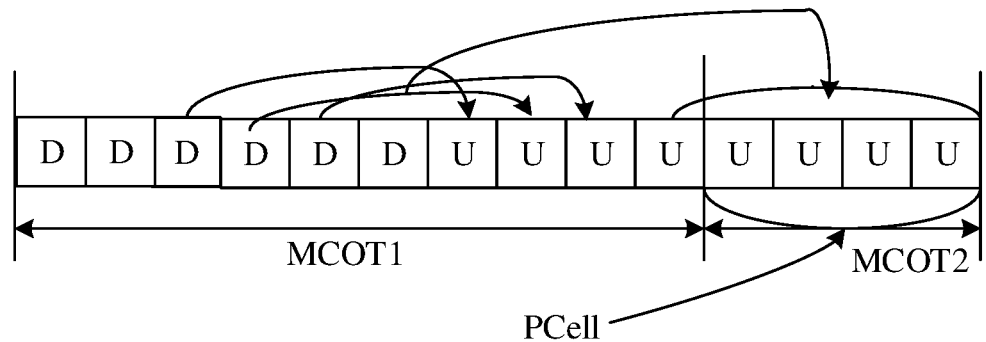
FIG. 4 is a second schematic diagram of multi-subframe scheduling according to an embodiment of the disclosure.

Or the downlink subframe sending the multi-subframe scheduling information and the scheduled UL subframes belong to different MCOTs. FIG. 4 is a second schematic diagram of multi-subframe scheduling according to an embodiment of the disclosure. As illustrated in FIG. 4, a last downlink subframe in an MCOT1 schedules four UL subframes in an MCOT2.

An MCOT is a maximum occupation duration initiated by the base station after successfully executing CCA in a cat4 manner and used to send downlink data or send downlink and UL data, or is a maximum occupation duration initiated by UE after executing CCA in the cat4 manner and used to send the UL data.

Or the PDCCH or ePDCCH for multi-subframe scheduling is sent through another carrier. That is, a cross-carrier scheduling manner is adopted. The first UL subframe and second UL subframe in FIG. 3 are two subframes, scheduled by a Primary Cell (Pcell) in a downlink cross-carrier scheduling manner, on an unlicensed carrier. Four UL subframes in FIG. 4 may also be scheduled together through a downlink subframe of another carrier.

No matter which scheduling manner is adopted, an interval between a subframe sending DCI and a scheduled UL subframe is more than or equal to 4.

For example, a value of a subframe interval between the first scheduled subframe and the subframe sending the scheduling information is predefined to be 4 and the interval between each of the other scheduled subframes and the subframe sending the scheduling information is larger than 4. Or the value of the subframe interval between the first scheduled subframe and the subframe sending the scheduling information is indicated through scheduling signaling, and the value may be an offset relative to 4, for example, an offset of 2 or 4 or 6 subframes. Therefore, a timing offset of the scheduled subframes is indicated.

Second Embodiment

Configuration of related scheduling information when a base station schedules multiple users on the same subframe is described in the embodiment.

When the base station schedules a group of UE for transmission on the same subframe, the base station may transmit some common indication information or scheduling parameter information in common DCI. The information includes at least one of the following information.

First information: a value of N of random backoff of CCA or a value of a CW, or a CCA type.

The CCA type includes CCA of a detection and CCA of multiple detections.

Second information: locations of the scheduled subframes or the number of continuous subframes, or a length of a scheduling UL burst.

When a same set of UEs are scheduled in all of the scheduled subframes, the number of the scheduled subframes is determined through one of the scheduled UEs with a minimum BSR. Meanwhile, relatively more Resource Block (RB) frequency-domain resources are allocated for each subframe of the UE with a large BSR.

Or, the number of the subframes or at least one of a CCA manner or a CCA parameter is determined according to a QoS level corresponding to born data.

The following scheduled subframe indications are included.

First: when the scheduled subframes are continuous subframes, an indication method includes two manners.

A first manner: only the number of the scheduled subframes is given. A location of a first scheduled subframe is determined according to a timing relationship of a subframe where the scheduling information is located plus four subframes or according to a predefined value or according to a value configured by high-layer signaling.

A second manner: an offset of the location of the first subframe relative to a location of a subframe obtained by adding four subframes to the subframe where the scheduling information is located and the number of the scheduled subframes are indicated in indication signaling. That is, a timing offset of the scheduled subframes is indicated in the indication signaling.

When the base station configures the related information, the configured value of the CW or N may be combined with the number of subframes which are scheduled at one time.

During a practical application, the base station determines the value of N or the value of the CW according to the number of the scheduled subframes and indicates the determined value of N or CW to the scheduled UE through common DCI. For example, if one subframe is scheduled, the CW is 1 and N=1 or 0. If two subframes are scheduled, CW=3. If three subframes or four subframes are scheduled, CW=7.

Or the value of the CW or the value of N corresponds to QoS of multiple data packets which are continuously scheduled.

When data packets born on multiple subframes belong to different QoSs, the CCA parameter during continuous transmission of the multiple subframes is determined according to a CCA type or parameter corresponding to the data packet with minimum QoS.

A specific indication method is indication through 3-bit information in the common DCI. 001 represents that CW=1 or N=1. 111 represents that N=7 or CW=7.

Third information: the scheduled subframe which is notified to the UE and in which a resource of a last symbol or last two symbols or first or first two symbols is reserved.

Two manners are included.

A first manner: 1 bit indicates whether the last subframe is a complete subframe or a corresponding symbol is required to be reserved in the last subframe, namely indicating a location of an ending symbol in the last subframe.

A second manner: an indication about the number of the scheduled subframes is combined. During a practical application, a bitmap manner is adopted for indication. For example, if a downlink subframe continuously schedules four UL subframes, last symbol resources in the second subframe and fourth subframe in the four subframes are required to be reserved, and signaling may be 0101.

In addition, the base station may also send signaling to notify the number of reserved symbols. For example, 1 represents reservation of two symbols and 0 represents reservation of one symbol. When new UE is scheduled to execute CCA in a cat2 manner, it is indicated that one symbol is reserved. When the new UE executes CCA in cat4, it is indicated that two symbols are reserved.

Figure 5:
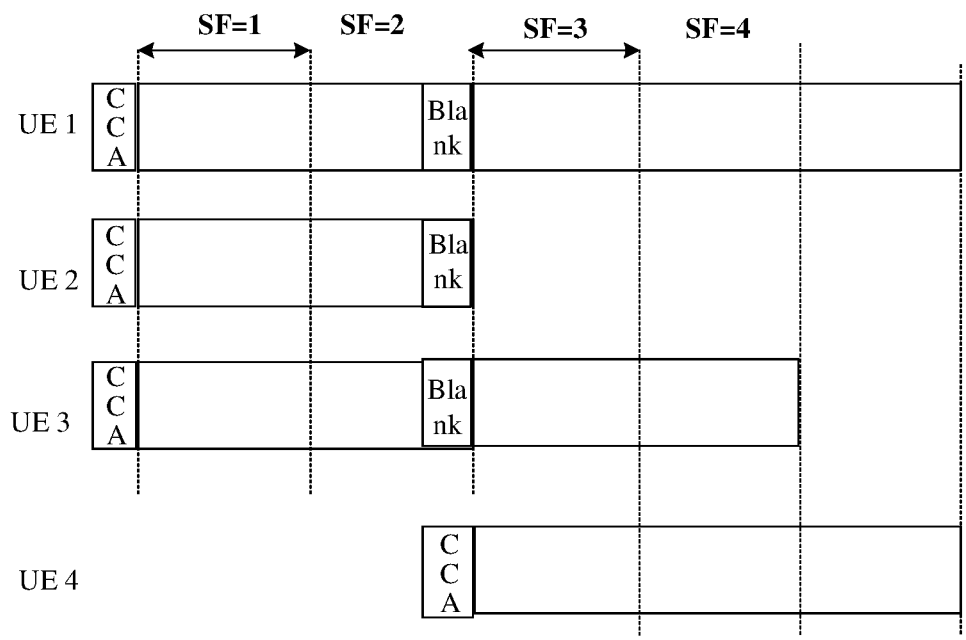
FIG. 5 is a first schematic diagram of multi-subframe scheduling of multiple users according to an embodiment of the disclosure.

FIG. 5 is a first schematic diagram of multi-subframe scheduling of multiple users according to an embodiment of the disclosure. As illustrated in FIG. 5, a base station simultaneously schedules, in a subframe 1, UE 1, UE 2 and UE 3 to perform transmission in two continuous subframes. Then, the base station may bear three pieces of information through some bit domains in a DCI format 1C bearer. For example, 10 represents two subframes are indicated to be continuously scheduled. Moreover, it is notified through a bit that a resource of a last symbol in a last scheduled subframe is required to be reserved. Therefore, new UE4 scheduled in a subframe 3 may successfully executes CCA.

The UE multiplexes the same resource in a frequency division manner or in a Multi-User Multiple Input Multiple Output (MU-MIMO) code division manner.

Scheduling parameter information of each UE, including a Modulation and Coding Scheme (MCS), an allocated resource location and the like, is still born through a specific search space. Scheduling information of the two subframes is born through a UL grant or born through two UL grants.

During blind detection of DCI, the UE performs blind detection for the number of the scheduled subframes in a common search space at first. If a multi-subframe scheduling manner with multiple PDCCHs or ePDCCHs included in a subframe is adopted, the UE determines the number of the PDCCHs or ePDCCHs corresponding to the scheduled subframes according to the number of the scheduled subframes and then performs blind detection on the corresponding number of PDCCHs or ePDCCHs in the specific search space.

Third Embodiment

Scheduling of UE for transmission in different numbers of subframes or UL bursts with different lengths and implementation of multi-user multiplexing are described in the embodiment.

A base station may schedule different UEs for transmission on different numbers of continuous subframes according to a BSR of each UE.

Figure 6:
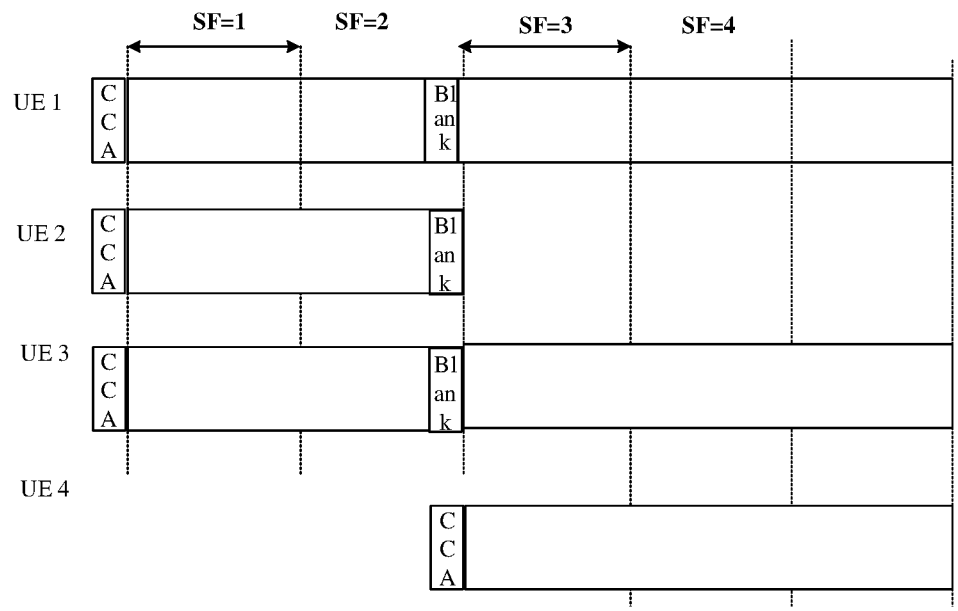
FIG. 6 is a second schematic diagram of multi-subframe scheduling of multiple users according to an embodiment of the disclosure.

FIG. 6 is a second schematic diagram of multi-subframe scheduling of multiple users according to an embodiment of the disclosure. As illustrated in FIG. 6, the base station simultaneously schedules three UEs on a subframe 1. Each UE occupies at least one interleaved unit on a frequency domain. Each interleaved unit includes 10 discrete RBs at equal intervals of 10 RBs. UE1 continuously schedules 5 UL subframes. UE2 schedules two subframes. UE3 continuously schedules four subframes. The base station schedules UE4 on a subframe 3. Therefore, the base station is required to indicate that UE1 and UE3 are required to reserve corresponding resources on a last symbol of a subframe 2 or a first symbol of the subframe 3, namely keeping a location of the symbol vacant with no data being sent. That is, a location of an ending symbol of a last subframe in multiple subframes is indicated. An implementation method includes that: data originally mapped to the location is punctured or the symbol resource is directly eliminated when data generation during rate matching.

Specific indication signaling is combined with the number of the scheduled subframes. If UE4 executes CCA at the end of the subframe 2, indication information sent to UE1 may be 01000 and indication information sent to UE3 is 0100. If UE4 executes CCA on the first symbol in the scheduled subframe 3, the indication information for UE1 and UE3 is changed into 00100 and 0010 respectively.

The UE may also determine the number of the scheduled subframes according to the information. The information is born through an UE-specific search space, for example, born through an idle bit field of a resource allocation part in original DCI formats 0 and 4.

When the number of symbols for CCA executed by the UE is larger than 1 or a value of a CW is 7 or a value of N is larger than 3, the base station, besides notifying the UE to reserve the resource on the corresponding symbol in the corresponding subframe, further notifies the number of reserved symbols. For example, 1 bit is adopted to indicate whether one symbol is kept blank or two symbols are kept blank. In combination with the subframe in which the blank symbols are required to be indicated, a specific indication manner includes the following two manners.

A first manner: two bits are required to indicate three states of each scheduled subframe in a bitmap manner. For example, 00 represents that no symbols are required to be reserved in the subframe, 01 represents that a symbol is required to be reserved in the subframe and 10 represents two symbols are required to be reserved in the subframe.

A second manner: one symbol or two symbols are explicitly determined according to an index of the scheduled subframe and a location of the scheduled subframe in an MCOT. When the scheduled subframe belongs to the MCOT initiated by the base station, one symbol is kept blank. When the scheduled subframe does not belong to the MCOT initiated by the base station, two symbols are kept blank.

A location of the reserved symbol is at the end of the scheduled subframe or is a location of a starting symbol in an intermediate scheduled subframe. The reserved or blank symbol is used for other UE or the base station to execute CCA. Or it is predefined that the last symbol in the last one of the scheduled subframes is always kept blank or reserved for the other UE or the base station to execute CCA.

When a Sounding Reference Signal (SRS) is configured for one of the multiple continuously scheduled subframes and the SRS is located at a last symbol in the subframe, the SRS is required to be punctured by the UE.

Fourth Embodiment

When a downlink subframe schedules multiple UL subframes and UL grants of the multiple UL subframes are born through different PDCCHs or ePDCCHs, UE determines the UL grant or DCI of each scheduled subframe in one of the following manners.

A first manner: determination through received scheduled subframe indication information. A base station provides a corresponding scheduled subframe indication in the UL grant.

For example, an offset of the scheduled subframe relative to a subframe obtained by adding four subframes to a subframe where scheduling information is located is indicated. 00 represents DCI or PDCCH or ePDCCH corresponding to an $(n+4)^{th}$ subframe. 01 represents DCI corresponding to an $(n+5)^{th}$ subframe or scheduling of the $(n+5)^{th}$ UL subframe. 10 represents DCI or PDCCH or ePDCCH corresponding to an $(n+6)^{th}$ subframe. 11 represents DCI or PDCCH or ePDCCH corresponding to an $(n+7)^{th}$ subframe. An $n^{th}$ subframe is a subframe in which a corresponding UL grant is sent, i.e., a subframe where the scheduling information is located.

A second manner: determination in an explicit mapping manner.

For example, the scheduled subframe is explicitly mapped through a minimum CCE index $n_{CCE}$ of DCI corresponding to the UL grant corresponding to the scheduled subframe.

During a practical application, the UE performs blind detection for a downlink control channel to obtain all UL grants or PDCCHs or ePDCCHs of the UE and then sequences minimum CCEs corresponding to each PDCCH or ePDCCH.

If a minimum CCE index of a first UL grant is $n_{CCE}$ and the subframe scheduled by the UL grant is an $n^{th}$ subframe, the index of the scheduled subframe is a function of the minimum CCE index corresponding to the DCI, namely $n=\text{fun}(n_{CCE})$.

Specially, under the condition that multiple UL subframes are continuously scheduled and the first subframe is determined by predefining n+k (k is more than or equal to 4), the DCI corresponding to the minimum CCE index corresponds to the first scheduled UL subframe n+k, DCI of the next location corresponds to the next UL subframe n+k+1 and the UL grant with a maximum CCE index corresponds to the last UL subframe.

Or two processes of explicit mapping and high-layer semi-static configuration of the offset are executed for determination.

A value of the offset is a magnitude of a subframe offset relative to the subframe n+4. The DCI with the minimum CCE index schedules the subframe n+4+offset, and the next PDCCH or ePDCCH corresponds to the subframe n+5+offset.

Fifth Embodiment

A method for reducing the number of times of blind detection for UE when a downlink subframe includes multiple UL grants or PDCCHs or ePDCCHs is described in the embodiment.

The following methods for reducing complexity in blind detection of the UE over multiple UL grants in a downlink subframe are included.

A first manner: the number of subframes during multi-subframe scheduling of each time or a length of a UL burst is predefined, thereby determining the number of the UL grants or the number of the PDCCHs or ePDCCHs. The UE, after obtaining the corresponding number of PDCCHs or ePDCCHs by blind detection, stops blind detection over control channels.

For example, it is predefined that the length of the UL burst is 2. Moreover, a base station adaptively schedules different TBs according to a size of an allocated RB.

A second method: the same DCI format, for example, format 1, is adopted for the multiple UL grants.

A third method: a search space is reduced. For example, a supported aggregation level is reduced or a DCI size is reduced.

The abovementioned methods may be combined for use.

In addition, a method for reducing blind detection complexity by multi-carrier scheduling may also be referred to.

Sixth Embodiment

An application scenario of two manners for multi-subframe scheduling is described in the embodiment.

When multiple UL subframes are simultaneously scheduled by a downlink subframe and the multiple UL subframes are discontinuous or belong to different TXOPs or belong to different bursts or are spaced by at least one downlink subframe or the number of subframes therebetween is larger than a predefined value, a multi-subframe scheduling manner with multiple UL grants included in a downlink subframe is adopted.

On the contrary, when the multiple scheduled subframes are continuous or belong to the same TXOP, a multi-subframe scheduling manner that multiple subframes are scheduled by a downlink subframe through a UL grant is preferred.

Or, when a carrier adopts self-carrier scheduling, a multi-subframe scheduling manner involving a UL grant is adopted.

Or when there are new data packets and retransmitted packets in the multiple scheduled subframes, a multi-subframe scheduling manner involving multiple subframes is adopted.

Figure 7:
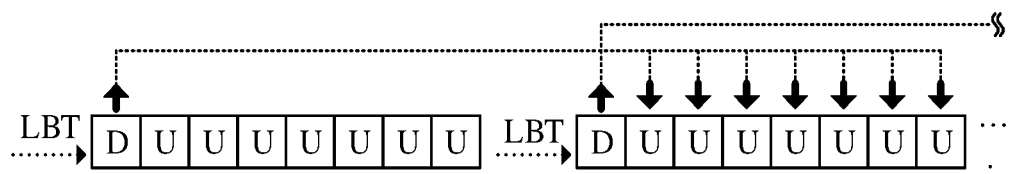
FIG. 7 is a schematic diagram of cross-TXOP multi-subframe scheduling according to an embodiment of the disclosure.

FIG. 7 is a schematic diagram of cross-TXOP multi-subframe scheduling according to an embodiment of the disclosure. As illustrated in FIG. 7, for self-scheduling, when an UL load is heavy than a downlink load, a cross-TXOP or cross-burst multi-subframe scheduling manner is adopted to meet a requirement that an interval between a UL grant and a PUSCH is larger than 4 ms.

Seventh Embodiment

Configuration and switching of multi-subframe scheduling in a present carrier and cross-carrier multi-subframe scheduling are described in the embodiment.

For an unlicensed carrier, influence of CCA and reduction in a UL transmission delay are considered. Cross-carrier scheduling of a licensed carrier is always supported. A base station indicates an index of a scheduled unlicensed carrier through a Carrier Indicator Field (CIF) or specific bit in DCI.

If the base station successfully executes CCA on the licensed carrier at a certain moment, a manner of self-scheduling in the present carrier may be adopted for UL subframes. Therefore, a load of control signaling of the licensed carrier may be reduced.

During cross-carrier scheduling of the unlicensed carrier on the licensed carrier is always configured, UE is required to simultaneously keep performing blind detection on the licensed carrier and the unlicensed carrier. Blind detection complexity of the UE may be reduced in the following manners.

A first manner: the licensed and unlicensed carriers share the same search space.

A second manner: it is restricted that only a Pcell of the licensed carrier supports cross-carrier scheduling of the unlicensed carrier and another licensed carrier may not support cross-carrier scheduling of the unlicensed carrier. Moreover, cross-carrier scheduling of the unlicensed carrier on the unlicensed carrier is not supported.

Or, when the number of carriers configured for the UE is larger than a predefined threshold value, the UE only supports self-scheduling and does not support cross-carrier scheduling. When the number of the carriers configured for the UE is smaller than the predefined threshold value, the base station configures that the UE supports cross-carrier scheduling.

Eighth Embodiment

A CCA manner for UE under multi-subframe scheduling is described in the embodiment.

Under a normal condition, the UE, after receiving scheduling indication information, executes CCA according to a related CCA parameter in the scheduling indication information or according to a predefined CCA manner.

In case of cross-carrier scheduling, UE executes CCA in a manner of cat4 including random backoff as a default. A value of a CW is a predefined value or a value configured by a base station. Or the base station directly configures a value of N of CCA according to the number of scheduled subframes.

For example, the base station sends scheduling information in a downlink subframe on a licensed carrier to schedule UE1 to continuously transmit PUSCHs in four subframes, i.e., subframes n, n+1, n+2 and n+3 and the base station directly notifies the UE through signaling that a backoff value for CCA is 6. The UE, after receiving the information, starts executing CCA from a last symbol of a subframe n−1 or a first symbol of the subframe n, and after the CCA is successful, if the base station does not send indication information about a blank symbol, the UE continuously transmits four scheduled PUSCHs. In case of a failure, the UE continues executing CCA on a last symbol of the subframe n or a first symbol of the subframe n+1, and after a success, if the base station does not send indication information about a blank symbol, the UE transmits the three corresponding PUSCHs according to the scheduling information. If the base station sends the indication information about the corresponding blank symbol, the UE is forbidden to send data on an idle resource in a symbol indicated by the indication information about the blank symbol.

When self-scheduling is adopted and the scheduled UL subframes belong to an MCOT initiated by the base station, a CCA manner is CCA of a predefined detection duration. When the scheduled UL subframes do not belong to the MCOT initiated by the base station, the CCA manner is a CCA manner of multiple detections with random backoff.

For example, the base station self-schedules an UE to perform transmission in 6 continuous subframes. The first three subframes belong to the same MCOT initiated by the base station, and the UE adopts cat2 to execute CCA of a fixed detection duration only once when executing CCA. For the latter three subframes, the UE is required to execute CCA in a cat4 manner before transmission.

Ninth Embodiment

When there are new data packets and retransmitted packets in subframes for multi-subframe scheduling, UL grants or DCI is processed as follows.

If a DCI format 4 is adopted for first transmission of a data packet, that is, two data packets are transmitted in a subframe and errors occur to one or two of the two data packets, DCI for retransmission is processed or determined as follows.

When two TBs share the same HARQ process number, once one packet is retransmitted, the DCI format 4, i.e., a scheduling manner that a subframe still schedules two flows or a subframe simultaneously schedules two data packets, is still adopted for retransmission scheduling.

When each of the two TBs has an independent HARQ process number, during retransmission, each of the two data packets may be scheduled by an independent DCI, or the two data packets are scheduled in different subframes.

From the above descriptions about the implementations, those skilled in the art may clearly know that the method according to the abovementioned embodiments may be implemented in a manner of combining software and a necessary universal hardware platform, and of course, may also be implemented through hardware, but the former is a preferred implementation under many circumstances. Based on such an understanding, the technical solutions of the disclosure substantially or parts making contributions to the related art may be embodied in form of software product, and the computer software product is stored in a storage medium (for example, a Read-Only Memory (ROM)/Random Access Memory (RAM), a magnetic disk and an optical disk), including a plurality of instructions configured to enable a terminal device (which may be a mobile phone, a computer, a server, a network device or the like) to execute the method in each embodiment of the disclosure.

An embodiment further provides a device for transmitting data, which is configured to implement the abovementioned embodiments and implementations. What has been described will not be elaborated. For example, term "module", used below, may be a combination of software and/or hardware capable of realizing a preset function. Although the devices described in the following embodiment are preferably implemented with software, implementation with hardware or a combination of the software and the hardware is also possible and conceivable.

Figure 8:
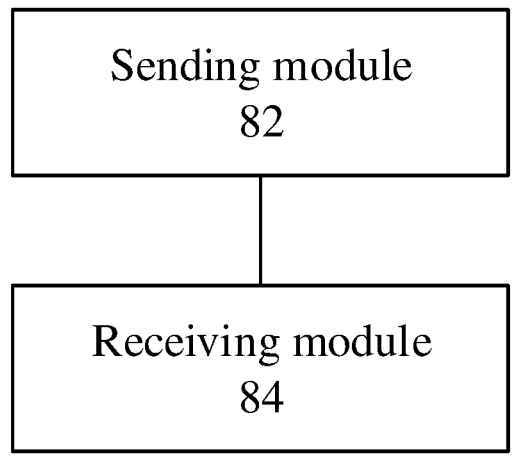
FIG. 8 is a first structure block diagram of a device for transmitting data according to an embodiment of the disclosure.

FIG. 8 is a first structure block diagram of a device for transmitting data according to an embodiment of the disclosure. As illustrated in FIG. 8, the device includes a sending module 82 and a receiving module 84.

The sending module 82 is configured to send scheduling information to an UE in a downlink subframe, the scheduling information being used to schedule the UE to transmit UL data in one or more UL subframes on an unlicensed carrier.

The receiving module 84 is connected with the sending module 82, and is configured to receive the UL data transmitted by the UE.

According to the device, the scheduling information is sent to the UE in the downlink subframe and the UL data sent by the UE in the one or more UL subframes on the unlicensed carrier indicated by the scheduling information is received. Therefore, the technical solution for multi-subframe scheduling is implemented on the unlicensed carrier, and the problem that there are no technical solutions for multi-subframe scheduling on the unlicensed carrier in the related art is solved.

It is to be noted that the device may be located in, but not limited to, a base station.

Figure 9:
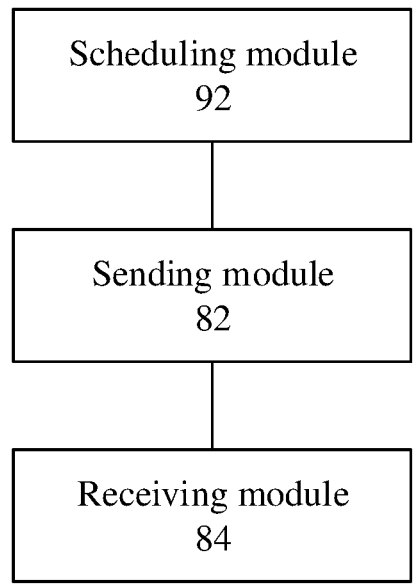
FIG. 9 is a second structure block diagram of a device for transmitting data according to an embodiment of the disclosure.

FIG. 9 is a second structure block diagram of a device for transmitting data according to an embodiment of the disclosure. As illustrated in FIG. 9, the device, besides all the modules illustrated in FIG. 8, further includes a scheduling module 92. The scheduling module 92 is connected with the sending module 82 and configured to, when multiple UEs are to be scheduled by the based station, schedule the multiple UEs in one of the following manners. A first manner: a same set of UEs are scheduled in all of the multiple UL subframes; and a second manner: a different set of UEs are scheduled in each of the multiple UL subframes.

It is to be noted that explanations about the first manner and the second manner may refer to explanations in the method embodiment and will not be elaborated herein.

In an embodiment of the disclosure, the scheduling information may include at least one of the following information: a backoff value of random backoff of CCA; a value of a CW; a CCA type; locations of the multiple UL subframes; a number of continuously scheduled subframes; a length of a scheduling UL burst; a location of an ending symbol in the last one of the multiple UL subframes; HARQ process number information; and NDI information.

It is to be noted that the CCA type is related to an MCOT and a scheduling manner. When the scheduling manner is self-scheduling and the one or more UL subframes and the downlink subframe belong to the same MCOT, the CCA type is CCA of a predefined detection duration.

When the scheduling manner is self-scheduling and the one or more UL subframes and the downlink subframe do not belong to the same MCOT, the CCA type is CCA of multiple detections with random backoff. When cross-carrier scheduling is adopted, the CCA type is CCA of multiple detections with random backoff.

The backoff value of random backoff of CCA or the value of the CW may be determined according to at least one of:

the number of continuously scheduled UL subframes, the backoff value of random backoff of CCA or the value of the CW being larger if the number of the continuously scheduled UL subframes is larger; a backoff value of random backoff of CCA corresponding to one of the plurality of UL subframes at a lowest quality of service (QoS) level; or a value of a CW of CCA corresponding to one of the plurality of UL subframes at a lowest QoS level. For example, the backoff value or the value of the CW is determined according to the number of the multiple continuously scheduled UL subframes. If one UL subframe is scheduled, the CW is 1 and the backoff value is 1 or 0. If two UL subframes are scheduled, the CW is 3. If three UL subframes or four UL subframes are scheduled, the CW is 7. However, there are no limits made.

In an embodiment of the disclosure, when the UE is scheduled in the first manner, the number of the continuously scheduled subframes may be determined through one of the multiple scheduled UEs with a minimum BSR. When a new UE is scheduled during the multiple UL subframes or the UE is scheduled in the second manner, at least one of first indication information or second indication information is sent to the UE, the first indication information being used to indicate the UL subframe in which at least one symbol is reserved or kept blank of the multiple UL subframes, the second indication information being configured to indicate the number of the reserved or blank symbols.

A location of the subframe where the at least one blank symbol is located is indicated in a bitmap manner. The at least one blank symbol is at least one of: a last symbol in a previous subframe of the first one of the UL subframes where the new UE is scheduled; a first symbol in the first one of the multiple UL subframes; and a last symbol in the last one of the multiple UL subframes.

In an embodiment of the disclosure, the multiple UL subframes correspond to the same DCI or different DCIs. The DCIs corresponding to the multiple UL subframes may be born in the following manners. In a first bearing manner, under the condition that the multiple UL subframes correspond to the same DCI, the DCIs corresponding to the multiple UL subframes are born through a PDCCH or an ePDCCH. In a second bearing manner, under the condition that the multiple UL subframes correspond to different DCIs, the DCI corresponding to each of the multiple UL subframes is independently coded and the DCIs corresponding to the multiple UL subframes are born through multiple PDCCHs or ePDCCHs. In a third bearing manner, under the condition that the multiple UL subframes correspond to different DCIs, the DCIs corresponding to the multiple UL subframes are jointly coded and the DCIs corresponding to the multiple UL subframes are born through a PDCCH or an ePDCCH.

It is to be noted that the multiple UL subframes correspond to the same DCI may be represented as the UL grants of the multiple UL subframes are the same UL grant, and the multiple UL subframes correspond to different DCIs may be represented as each of the multiple UL subframes has an independent UL grant. For the first bearing manner, the UE is only required to detect one UL grant in a downlink subframe. For the third bearing manner, the UE may obtain the scheduling information of the multiple subframes by detecting only one PDCCH or ePDCCH. For the second bearing manner, the UE may perform blind detection on multiple PDCCHs or ePDCCHs in the downlink subframe. In these bearing manners, the UE may obtain multiple UL grants in the downlink subframe, UL data transmission efficiency may further be improved, and a signaling overhead may be reduced.

It is to be noted that the second bearing manner or the third bearing manner may be adopted under at least one of the following conditions: the multiple UL subframes are discontinuous; the multiple UL subframes belong to different TXOPs; the multiple UL subframes belong to different UL bursts; the multiple UL subframes are spaced by at least one downlink subframe; or when two adjacent UL subframes of the plurality of UL subframes are spaced by a plurality of subframes, a number of the plurality of subframes being larger than a predetermined value. The first bearing manner may be adopted under at least one of the following conditions: the multiple UL subframes are continuous; or the multiple UL subframes belong to the same TXOP.

In an embodiment of the disclosure, when each UL subframe in the multiple UL subframes transmits a data packet, under the condition that the multiple UL subframes transmit multiple different data packets, each data packet in the multiple data packets has an independent HARQ process number. Under the condition that the multiple UL subframes transmit multiple different data packets, the multiple data packets share the same HARQ process number and each UL subframe in the multiple UL subframes corresponds to a 1-bit NDI, a location of a retransmitted packet corresponding to one of the multiple data packets in the multiple UL subframes being the same as a location of the data packet corresponding to the retransmitted packet in the multiple UL subframes during first transmission. Under the condition that multiple data packets having the same data are transmitted in the multiple UL subframes, or the multiple data packets which are of different redundancy versions but have the same data are transmitted in the multiple UL subframes, the multiple data packets share the same HARQ process number, the multiple data packets share the same HARQ process number. When there are new data packets and retransmitted packets in the multiple UL subframes, each of the multiple UL subframes may be scheduled to correspond to a HARQ process number and/or NDI in a UL grant, the HARQ process numbers of the retransmitted packets being the same as HARQ process numbers of the data packets corresponding to the retransmitted packets during first transmission. Under the condition that one of the multiple UL subframes transmits two data packets, the two data packets share the same HARQ process number and a DCI format 4 is adopted for first transmission of one of the two data packets, if one data packet in the two data packets is failed to be transmitted, a DCI format 0 is adopted to schedule a retransmitted packet corresponding to the data packet which is failed to be transmitted; if both of the two data packets are failed to be transmitted, the DCI format 4 is adopted to schedule two retransmitted packets corresponding to the two data packets in the same UL subframe; and under the condition that each of the two data packets has a HARQ process number, the retransmitted packet corresponding to each of the two data packets is independently scheduled.

According to the device, the problem of reduction in the UL data transmission efficiency in the related art is further solved, and the effects of reducing the signaling overhead and increasing a UL transmission rate on an unlicensed spectrum are further achieved. In addition, multi-user multiplexing under continuous scheduling is further implemented, and flexibility and efficiency are improved.

Figure 10:
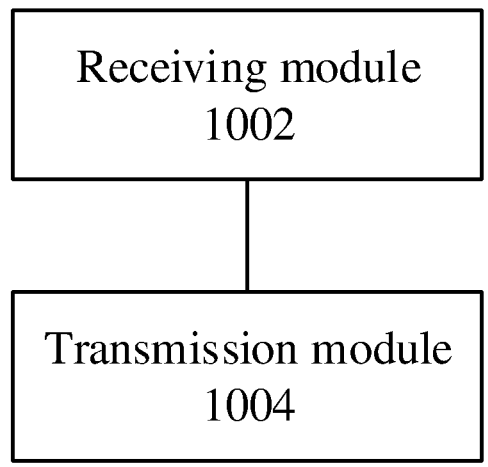
FIG. 10 is a third structure block diagram of a device for transmitting data according to an embodiment of the disclosure.

An embodiment provides a device for transmitting data. FIG. 10 is a second structure block diagram of a data transmission device according to an embodiment of the disclosure. As illustrated in FIG. 10, the device includes a receiving module 1002 and a transmission module 1004.

The receiving module 1002 is configured to receive scheduling information sent by a base station in a downlink subframe, the scheduling information being configured to schedule UE to transmit UL data in one or more UL subframes on an unlicensed carrier.

The transmission module 1004 is connected with the receiving module 1002, and is configured to transmit the UL data to the base station in the one or more UL subframes according to indication information.

By the device, the scheduling information by the base station is received in the downlink subframe and the UL data is transmitted to the base station in the one or more UL subframes on the unlicensed carrier according to the scheduling information. Therefore, the technical solution for multi-subframe scheduling is implemented on the unlicensed carrier, and the problem that there are no technical solutions for multi-subframe scheduling on the unlicensed carrier in the related art is solved.

It is to be noted that the device may be located in, but not limited to, the UE.

In an embodiment of the disclosure, when multiple UEs are to be scheduled by a base station, the multiple UEs are scheduled in one of the following manners: a first manner: a same set of UEs are scheduled in all of the multiple UL subframes; and a second manner: a different set of UEs are scheduled in each of the multiple UL subframes.

It is to be noted that explanations about the first manner and the second manner may refer to explanations in the corresponding method embodiment and will not be elaborated herein.

In an embodiment of the disclosure, the scheduling information may include at least one of the following information: a backoff value of random backoff of CCA; a value of a CW; a CCA type; locations of the multiple UL subframes; the number of scheduled subframes; a length of a scheduling UL burst; first indication information used to indicate the UL subframe in which at least one symbol is reserved or kept blank of the multiple UL subframes; second indication information used to indicate the number of symbols which are reserved or kept blank; the number of symbols occupied by data in each UL subframe or a last UL subframe of the multiple UL subframes; timing offset information of the scheduled subframes; a location of an ending symbol in the last one of the multiple UL subframes; HARQ process number information; and NDI information.

It is to be noted that the CCA type is related to an MCOT and a scheduling manner. When the scheduling manner is self-scheduling and the one or more UL subframes and the downlink subframe belong to the same MCOT, the CCA type is CCA of a predefined detection duration. When the scheduling manner is self-scheduling and the one or more UL subframes and the downlink subframe do not belong to the same MCOT, the CCA type is CCA of multiple detections with random backoff. When cross-carrier scheduling is adopted, the CCA type is CCA of multiple detections with random backoff. The backoff value of random backoff of CCA or the value of the CW is determined according to at least one of: the number of the continuously scheduled UL subframes, the backoff value of random backoff of CCA or the value of the CW being larger if the number of the continuously scheduled UL subframes is larger; a backoff value of random backoff of CCA corresponding to one of the plurality of UL subframes at a lowest quality of service (QoS) level; or a value of a CW of CCA corresponding to one of the plurality of UL subframes at a lowest QoS level. For example, the backoff value of CCA or the value of the CW is determined according to the number of the continuously scheduled UL subframes. If one UL subframe is scheduled, the CW is 1 and the backoff value is 1 or 0. If two UL subframes are scheduled, the CW is 3. If three UL subframes or four UL subframes are scheduled, the CW is 7. However, there are no limits made.

In an embodiment of the disclosure, when the UE is scheduled in the first manner, the number of the continuously scheduled subframes may be determined through one of the multiple scheduled UEs with a minimum BSR. When a new UE is scheduled during the multiple UL subframes or the UE is scheduled in the second manner, at least one of the first indication information or the second indication information sent by the base station is received.

In an embodiment, a location of the subframe where at least one blank symbol is located is indicated in a bitmap manner. The at least one blank symbol is at least one of: a last symbol in a previous subframe of the first one of the at least one UL subframe where the newly scheduled UE is scheduled; a first symbol in the first one of the at least one UL subframe where the newly scheduled UE is scheduled; a first symbol in the first one of the multiple UL subframes; and a last symbol in the last one of the multiple UL subframes.

The second indication information may include: a bitmap; and location information of the one or more UL subframes in the MCOT. Indicating the number of blank subframes through the bitmap may be represented in, but not limited to, the following manner. Multiple bits in the bitmap may be used to indicate states of each UL scheduled subframe. For example, two bits are adopted to indicate three states: 00 represents that no symbols are required to be reserved in the UL subframe, 01 represents that a symbol is required to be reserved in the UL subframe and 10 represents that 2 symbols are required to be reserved in the UL subframe. The number of the blank symbols is indicated through location information of the one or more UL subframes in the MCOT. That is, the number of the blank symbols is indicated through the location information of the scheduled subframe in the MCOT. For example, when the scheduled subframe belongs to the MCOT, a symbol is kept blank. When the scheduled subframe does not belong to the MCOT, two symbols are kept blank.

In an embodiment of the disclosure, the multiple UL subframes correspond to the same DCI or different DCIs. The DCIs corresponding to the multiple UL subframes may be born in the following manners. In a first bearing manner, under the condition that the multiple UL subframes correspond to the same DCI, the DCIs corresponding to the multiple UL subframes are born through a PDCCH or an ePDCCH. In a second bearing manner, under the condition that the multiple UL subframes correspond to different DCIs, the DCI corresponding to each of the multiple UL subframes is independently coded and the DCIs corresponding to the multiple UL subframes are born through multiple PDCCHs or ePDCCHs. In a third bearing manner, under the condition that the multiple UL subframes correspond to different DCIs, the DCIs corresponding to the multiple UL subframes are jointly coded and the DCIs corresponding to the multiple UL subframes are born through a PDCCH or an ePDCCH.

It is to be noted that the multiple UL subframes correspond to the same DCI may be represented as the UL grants of the multiple UL subframes are the same UL grant, the multiple UL subframes correspond to different DCIs may be represented as each of the multiple UL subframes has an independent UL grant. For the first bearing manner, the UE is only required to detect one UL grant in a downlink subframe. For the third bearing manner, the UE may obtain the scheduling information of the multiple subframes by detecting only one PDCCH or ePDCCH. For the second bearing manner, the UE may perform blind detection on multiple PDCCHs or ePDCCHs in the downlink subframe.

In these bearing manners, the UE may obtain multiple UL grants in the downlink subframe, UL data transmission efficiency may further be improved, and a signaling overhead may be reduced.

It is to be noted that the second bearing manner or the third bearing manner may be adopted under at least one of the following conditions: the multiple UL subframes are discontinuous; the multiple UL subframes belong to different TXOPs; the multiple UL subframes belong to different UL bursts; the multiple UL subframes are spaced by at least one downlink subframe; or when two adjacent UL subframes of the plurality of UL subframes are spaced by a plurality of subframes, a number of the plurality of subframes being larger than a predetermined value. The first bearing manner may be adopted under at least one of the following conditions: the multiple UL subframes are continuous; or the multiple UL subframes belong to the same TXOP.

Figure 11:
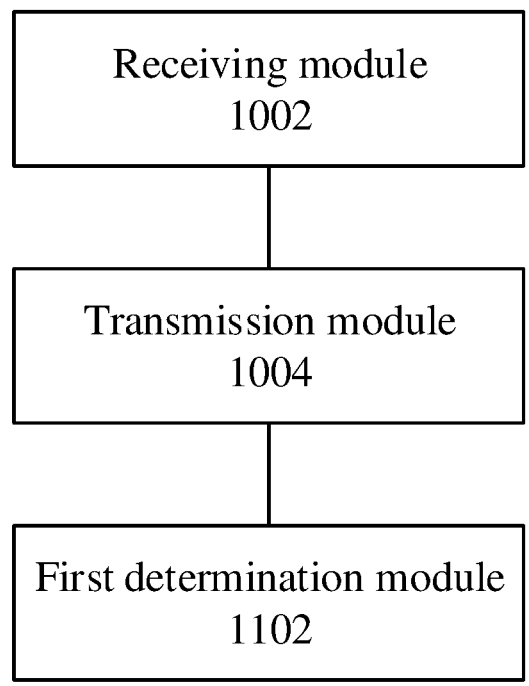
FIG. 11 is a fourth structure block diagram of a device for transmitting data according to an embodiment of the disclosure.

In an embodiment of the disclosure, FIG. 11 is a fourth structure block diagram of a device for transmitting data according to an embodiment of the disclosure. As illustrated in FIG. 11, the device further includes a first determination module 1102, which is connected with the transmission module 1004 and configured to, when the DCI corresponding to each of the multiple UL subframes is independently coded and the DCIs corresponding to the multiple UL subframes are born through multiple PDCCHs or ePDCCHs, determine the PDCCH or ePDCCH corresponding to each UL subframe in the multiple UL subframes in at least one of the following manners: determination through indication information of the one or more UL subframes, the indication information including offsets of the one or more UL subframes relative to the downlink subframe; and determination through through a smallest one of control channel element (CCE) indexes of the PDCCHs or ePDCCHs corresponding to all of the plurality of UL subframes, the DCI being DCI corresponding to the UL grants corresponding to the one or more UL subframes.

For example, when the indication information includes the offsets of the one or more UL subframes relative to the downlink subframe, for example, the downlink subframe is an $n^{th}$ subframe, the $n^{th}$ subframe being a subframe in which the UL grant is sent, 00 represents DCI or PDCCH or ePDCCH corresponding to an $(n+4)^{th}$ subframe, 01 represents DCI or PDCCH or ePDCCH corresponding to an $(n+5)^{th}$ subframe, 10 represents DCI or PDCCH or ePDCCH corresponding to an $(n+6)^{th}$ subframe and 11 represents DCI or PDCCH or ePDCCH corresponding to an $(n+7)^{th}$ subframe. There are no limits.

Figure 12:
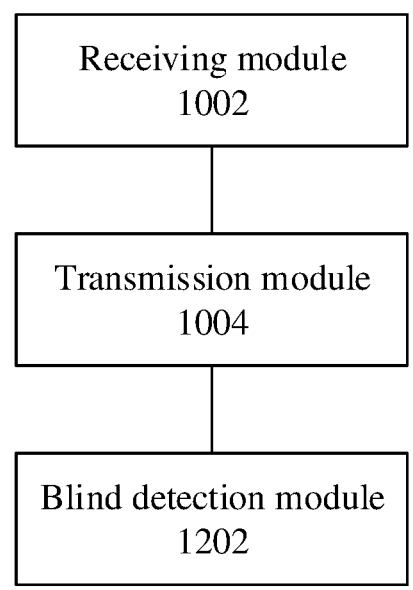
FIG. 12 is a fifth structure block diagram of a device for transmitting data according to an embodiment of the disclosure.

In an embodiment of the disclosure, FIG. 12 is a fifth structure block diagram of a device for transmitting data according to an embodiment of the disclosure. As illustrated in FIG. 12, the device further includes a blind detection module 1202, which is connected with the transmission module 1004 and configured to, when the DCI corresponding to each of the multiple UL subframes is independently coded and the DCIs corresponding to the multiple UL subframes are born through multiple PDCCHs or ePDCCHs, reduce the number of times for which the UE performs blind detection on the PDCCHs or ePDCCHs in at least one of the following manners: the number of the UL subframes or the length of the UL burst is predefined; the same DCI format is adopted for multiple UL grants; and the search space is reduced. The blind detection module 1202 reduces complexity in blind detection of multiple UL grants in the downlink subframe.

In an embodiment of the disclosure, when each UL subframe in the multiple UL subframes transmits a data packet, under the condition that the multiple UL subframes transmit multiple different data packets, each data packet in the multiple data packets has an independent HARQ process number. Under the condition that the multiple UL subframes transmit multiple different data packets, the multiple data packets share the same HARQ process number and each UL subframe in the multiple UL subframes corresponds to a 1-bit NDI, a location of a retransmitted packet of one of the multiple data packets in the multiple UL subframes being the same as a location of the data packet corresponding to the retransmitted packet in the multiple UL subframes during first transmission. Under the condition that multiple data packets having the same data are transmitted in the multiple UL subframes, or the multiple data packets which are of different redundancy versions but have the same data are transmitted in the multiple UL subframes, the multiple data packets share the same HARQ process number. When there are new data packets and retransmitted packets in the multiple UL subframes, each of the multiple UL subframes may be scheduled to correspond to a HARQ process number and/or NDI in a UL grant, the HARQ process numbers of the retransmitted packets being the same as HARQ process numbers of the data packets corresponding to the retransmitted packets during first transmission. Under the condition that one of the multiple UL subframes transmits two data packets, the two data packets share the same HARQ process number and a DCI format 4 is adopted for first transmission of one data packet in the two data packets, if one data packet in the two data packets is failed to be transmitted, a DCI format 0 is adopted to schedule a retransmitted packet corresponding to the data packet which is failed to be transmitted; if both of the two data packets are failed to be transmitted, the DCI format 4 is adopted to schedule two retransmitted packets corresponding to the two data packets in the same UL subframe; and under the condition that each of the two data packets has a HARQ process number, the retransmitted packet corresponding to each of the two data packets is independently scheduled.

It is to be noted that each of the abovementioned modules may be implemented through software or hardware and the latter condition may be implemented in, but not limited to, the following manner: all of the modules are located in the same processor or the modules are located in multiple processors respectively.

An embodiment of the disclosure further provides a storage medium. In the embodiment, the storage medium may be configured to store a program code configured to execute the following steps.

In S1, scheduling information is sent to UE in a downlink subframe, the scheduling information being configured to indicate the UE to transmit UL data in one or more UL subframes on an unlicensed carrier.

In S2, the UL data transmitted by the UE is received.

In the embodiment, the storage medium may include, but not limited to: various media capable of storing program codes such as a U disk, a ROM, a RAM, a mobile hard disk, a magnetic disk or an optical disk.

Specific examples in the embodiment may refer to the examples described in the abovementioned embodiments and optional implementations and will not be elaborated in the embodiment.

Obviously, those skilled in the art should know that each module or each step of the disclosure may be implemented by a universal computing device, and the modules or operations may be concentrated on a single computing device or distributed on a network formed by a plurality of computing devices, and may optionally be implemented by program codes executable for the computing devices, so that the modules or operations may be stored in a storage device for execution with the computing devices, the illustrated or described operations may be executed in sequences different from those described here in some circumstances, or may form each integrated circuit module respectively, or multiple modules or operations therein may form a single integrated circuit module for implementation. As a consequence, the disclosure is not limited to any specific hardware and software combination.

In the embodiments of the disclosure, when being implemented in form of software functional module and sold or used as an independent product, the data transmission method may also be stored in a computer-readable storage medium. Based on such an understanding, the technical solutions of the embodiments of the disclosure substantially or parts making contributions to the related art may be embodied in form of software product, and the computer software product is stored in a storage medium, including a plurality of instructions configured to enable a computer device (which may be a personal computer, a server, a network device or the like) to execute all or part of the method in each embodiment of the disclosure. The above-mentioned storage medium includes: various media capable of storing program codes such as a U disk, a mobile hard disk, a ROM, a magnetic disk or an optical disk. As a consequence, the embodiments of the disclosure are not limited to any specific hardware and software combination.

Correspondingly, the embodiments of the disclosure further provide a computer storage medium, in which a computer program is stored, the computer program being configured to execute the data transmission method of the embodiments of the disclosure.

The above is only the preferred embodiment of the disclosure and not intended to limit the scope of protection of the disclosure. Any modifications, equivalent replacements, improvements and the like made within the spirit and principle of the disclosure shall fall within the scope of protection of the disclosure.

The invention claimed is:

1. A method for transmitting data, comprising:
sending scheduling information to a user equipment (UE) in a downlink subframe, the scheduling information being used to schedule the UE to transmit uplink (UL) data in at least one UL subframe on an unlicensed carrier, wherein the at least one UL subframe comprises a plurality of UL subframes; and
receiving the UL data transmitted by the UE;
wherein the scheduling information comprises: a clear channel assessment (CCA) type, a number of scheduled subframes, timing offset information of the scheduled subframes, and information for indicating a location of an ending symbol in a last one of the plurality of UL subframes;
wherein the CCA type comprises CCA of a predefined detection duration and CCA of multiple detections with random backoff;
wherein in response to self-scheduling is adopted and the at least one UL subframe and the downlink subframe belong to a same maximum channel occupation time (MCOT), the CCA type is the CCA of the predefined detection duration; and
wherein in response to a plurality of UEs are to be scheduled, the plurality of UEs are scheduled in one of the following manners:
a first manner: a same set of UEs are scheduled in all of the plurality of UL subframes; and
a second manner: a different set of UEs are scheduled in each of the plurality of UL subframes.

2. The method of claim 1, wherein when the self-scheduling is adopted and the at least one UL subframe and the downlink subframe do not belong to the same MCOT, the CCA type is the CCA of multiple detections with random backoff; and
when cross-carrier scheduling is adopted, the CCA type is the CCA of multiple detections with random backoff.

3. The method of claim 1,
wherein in response to when a new UE is scheduled during the plurality of UL subframes or the different set of UEs are scheduled in each of the plurality of UL subframes, at least one of first indication information or second indication information is sent to the UE, the first indication information being used for indicating an UL subframe in which at least one symbol is reserved or kept blank of the plurality of UL subframes, the second indication information being used for indicating a number of the reserved or blank symbols, and
wherein a location of the subframe where the at least one blank symbol is located is indicated in a bitmap manner.

4. The method of claim 3, wherein the at least one blank symbol comprises at least one of:
a last symbol in a previous subframe of a first one of multiple UL subframes where the newly scheduled UE is scheduled;
a first symbol in the first one of multiple UL subframes where the newly scheduled UE is scheduled;
a first symbol in a first one of the plurality of UL subframes; or
a last symbol in a last one of the plurality of UL subframes.

5. The method of claim 1,
wherein DCIs corresponding to the plurality of UL subframes are a same DCI or different DCIs;
when the DCIs corresponding to the plurality of UL subframes are the same DCI, the DCIs corresponding to the plurality of UL subframes are born through a PDCCH or an ePDCCH; and
when the DCIs corresponding to the plurality of UL subframes are different DCIs, DCI corresponding to each of the plurality of UL subframes is independently coded and the DCIs corresponding to the plurality of UL subframes are born through a plurality of PDCCHs or ePDCCHs, or the DCIs corresponding to the plurality of UL subframes are jointly coded and the DCIs corresponding to the plurality of UL subframes are born through a PDCCH or an ePDCCH.

6. The method of claim 5, wherein under at least one of the following conditions, the DCI corresponding to each of the plurality of UL subframes is independently coded and the DCIs corresponding to the plurality of UL subframes are born through the plurality of PDCCHs or ePDCCHs, or the DCIs corresponding to the plurality of UL subframes are jointly coded and the DCIs corresponding to the plurality of UL subframes are born through the PDCCH or the ePDCCH:
the plurality of UL subframes are discontinuous;
the plurality of UL subframes belong to different transmission opportunities (TXOPs);
the plurality of UL subframes belong to different UL bursts; or the plurality of UL subframes are spaced by at least one downlink subframe.

7. The method of claim 5, wherein under at least one of the following conditions, the DCIs corresponding to the plurality of UL subframes are born through the PDCCH or the ePDCCH:
the plurality of UL subframes are continuous; or
the plurality of UL subframes belong to a same TXOP.

8. The method of claim 1, wherein each of the plurality of UL subframes transmits a data packet, and the data packet transmitted in each of the plurality of subframes and at least one of a HARQ process number or NDI of the data packet transmitted in each UL subframe are determined in one of the following manners:
when the plurality of UL subframes transmit a plurality of different data packets, each of the plurality of data packets has an independent HARQ process number;
when the plurality of UL subframes transmit a plurality of different data packets, the plurality of data packets share a same HARQ process number and each of the plurality of UL subframes corresponds to a 1-bit NDI, a location of a retransmitted packet corresponding to one of the plurality of data packets in the plurality of UL subframes being the same as a location of the data packet in the plurality of UL subframes during first transmission; and
when a plurality of data packets having the same data are transmitted in the plurality of UL subframes, or the plurality of data packets which are of different redundancy versions but have the same data are transmitted in the plurality of UL subframes, the plurality of data packets share the same HARQ process number.

9. The method of claim 1, wherein when both new data packets and a retransmitted packet are transmitted in the plurality of UL subframes, each of the plurality of UL subframes is scheduled to correspond to at least one of a HARQ process number or a NDI in an UL grant, an HARQ process number of the retransmitted packet being the same as an HARQ process number of the data packet corresponding to the retransmitted packet during first transmission.

10. The method of claim 1,
wherein when one of the plurality of UL subframes transmits two data packets, the two data packets share a same HARQ process number and a DCI format 4 is adopted for first transmission of one of the two data packets, if one of the two data packets is failed to be transmitted, a DCI format 0 is adopted to schedule a retransmitted packet corresponding to the data packet which is failed to be transmitted; if both of the two data packets are failed to be transmitted, the DCI format 4 is adopted to schedule two retransmitted packets corresponding to the two data packets in a same UL subframe; and
when each of the two data packets has a HARQ process number, the retransmitted packet corresponding to each of the two data packets is independently scheduled.

11. A method for transmitting data, comprising:
receiving scheduling information in a downlink subframe, the scheduling information being used to schedule a user equipment (UE) to transmit uplink (UL) data in at least one UL subframe on an unlicensed carrier, wherein the at least one UL subframe comprises a plurality of UL subframes; and
transmitting the UL data in the at least one UL subframe on the unlicensed carrier according to the scheduling information;
wherein the scheduling information comprises: a clear channel assessment (CCA) type a number of scheduled subframes, timing offset information of the scheduled subframes, and information for indicating a location of an ending symbol in a last one of the plurality of UL subframes;
wherein the CCA type comprises CCA of a predefined detection duration and CCA of multiple detections with random backoff;
wherein in response to self-scheduling is adopted and the at least one UL subframe and the downlink subframe belong to a same maximum channel occupation time (MCOT), the CCA type is the CCA of the predefined detection duration; and
wherein in response to a plurality of UEs are to be scheduled, the plurality of UEs are scheduled in one of the following manners:
a first manner: a same set of UEs are scheduled in all of the plurality of UL subframes; and
a second manner: a different set of UEs are scheduled in each of the plurality of UL subframes.

12. The method of claim 11, wherein when DCI corresponding to each of the plurality of UL subframes is independently coded and DCIs corresponding to the plurality of UL subframes are born through a plurality of physical downlink control channel (PDCCHs) or enhanced PDCCH (ePDCCHs), the PDCCH or ePDCCH corresponding to each of the plurality of UL subframes is determined in at least one of the following manners:
determining the PDCCH or ePDCCH corresponding to each of the plurality of UL subframes through indication information of the at least one UL subframe, the indication information comprising offsets of the at least one UL subframe relative to the downlink subframe; or
determining the PDCCH or ePDCCH corresponding to each of the plurality of UL subframes through a smallest one of control channel element (CCE) indexes of the PDCCHs or ePDCCHs corresponding to all of the plurality of UL subframes.

13. The method of claim 11, wherein when DCI corresponding to each of the plurality of UL subframes is independently coded and DCIs corresponding to the plurality of UL subframes are born through a plurality of PDCCHs or ePDCCHs, a number of times for which the UE performs blind detection on the PDCCHs or ePDCCHs is reduced in at least one of the following manners:
predefining a number of the plurality of UL subframes or a length of an UL burst;
adopting a same DCI format for a plurality of UL grants; or
reducing search space.

14. A device for transmitting data, comprising a processor and a memory storing computer-readable operation instructions, wherein when the computer-readable operation instructions in the memory are run, the processor is configured to:
send scheduling information to a user equipment (UE) in a downlink subframe, the scheduling information being used to schedule the UE to transmit uplink (UL) data in at least one UL subframes on an unlicensed carrier, wherein the at least one UL subframe comprises a plurality of UL subframes; and
receive the UL data transmitted by the UE;
wherein the scheduling information comprises: a clear channel assessment (CCA) type, a number of scheduled subframes, timing offset information of the scheduled subframes, and information for indicating a location of an ending symbol in a last one of the plurality of UL subframes;

wherein the CCA type comprises CCA of a predefined detection duration and CCA of multiple detections with random backoff;

wherein in response to self-scheduling is adopted and the at least one UL subframe and the downlink subframe belong to a same maximum channel occupation time (MCOT), the CCA type is the CCA of the predefined detection duration; and wherein the device further comprises a scheduling module, configured to, in response to a plurality of UEs are to be scheduled, schedule the plurality of UEs in one of the following manners:

a first manner: schedule a same set of UEs in all of the plurality of UL subframes; and a second manner: schedule a different set of UEs in each of the plurality of UL subframes.

* * * * *